(12) United States Patent
Yu

(10) Patent No.: US 10,129,739 B2
(45) Date of Patent: Nov. 13, 2018

(54) DATA TRANSMISSION METHOD AND DEVICE

(71) Applicant: Huawei Technologies Co., Ltd., Shenzhen, Guangdong (CN)

(72) Inventor: Qi Yu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 164 days.

(21) Appl. No.: 15/142,785

(22) Filed: Apr. 29, 2016

(65) Prior Publication Data

US 2016/0249206 A1 Aug. 25, 2016

Related U.S. Application Data

(63) Continuation of application No. PCT/CN2013/086236, filed on Oct. 30, 2013.

(51) Int. Cl.
*H04W 4/00* (2018.01)
*H04W 8/24* (2009.01)
*H04W 4/70* (2018.01)

(52) U.S. Cl.
CPC ............ *H04W 8/24* (2013.01); *H04W 4/70* (2018.02)

(58) Field of Classification Search
CPC ...................................................... H04W 8/24
USPC ........................................................ 370/328
See application file for complete search history.

(56) References Cited

U.S. PATENT DOCUMENTS

| | | | | |
|---|---|---|---|---|
| 9,173,128 | B2* | 10/2015 | Backholm | H04W 28/0273 |
| 2010/0208662 | A1 | 8/2010 | Fuste et al. | |
| 2011/0306386 | A1* | 12/2011 | Centoza | H04W 28/08 |
| | | | | 455/552.1 |
| 2012/0276867 | A1* | 11/2012 | McNamee | H04L 12/1407 |
| | | | | 455/406 |
| 2013/0124618 | A1* | 5/2013 | Zhong | H04W 12/06 |
| | | | | 709/203 |
| 2013/0229944 | A1* | 9/2013 | Montemurro | H04W 4/206 |
| | | | | 370/254 |
| 2013/0324121 | A1* | 12/2013 | Kwon | H04W 4/005 |
| | | | | 455/435.1 |
| 2014/0003316 | A1 | 1/2014 | Yu et al. | |
| 2014/0050085 | A1* | 2/2014 | Hong | H04W 4/70 |
| | | | | 370/230 |
| 2015/0333991 | A1* | 11/2015 | Liu | H04L 43/0835 |
| | | | | 455/406 |

FOREIGN PATENT DOCUMENTS

| | | |
|---|---|---|
| CN | 102118739 A | 7/2011 |
| CN | 102158901 A | 8/2011 |
| CN | 103109570 A | 5/2013 |
| KR | 20120125091 A | 11/2012 |

\* cited by examiner

*Primary Examiner* — Gerald A Smarth

(57) ABSTRACT

The present invention provides a data transmission method and a device. In the method, in a case in which a first device is registered with a second device, the first device acquires a data transfer policy; and the first device sends data to the second device according to the data transfer policy, so that efficiency of data sharing and data analysis is improved by means of a DMR function of a network-side node.

51 Claims, 11 Drawing Sheets

DATA TRANSMISSION METHOD AND DEVICE

CROSS-REFERENCE TO RELATED APPLICATION

This application is a continuation of International Application No. PCT/CN2013/086236, filed on Oct. 30, 2013, which is hereby incorporated by reference in its entirety.

TECHNICAL FIELD

The present invention relates to the communications field, and in particular, to a data transmission method and a device.

BACKGROUND

Machine-to-machine communications (Machine-to-Machine Communications, M2M) is a network-based application and service with intelligent interaction between machines as a core, and implements data communication without manual intervention by embedding a wireless or wired communications module and application processing logic into machines, so as to satisfy an informatization requirement of users in aspects such as monitoring, commanding and scheduling, data collection, and measurement.

A general objective of the one M2M standard organization for machine-to-machine communications is to create an open standard for a service layer of M2M communications, to facilitate establishing a future network that integrates various devices and services, so that M2M services are interoperable, and M2M applications can share a basic service and can be implemented independent of a network.

FIG. 1 is an architectural diagram of one M2M. On an M2M device, a machine-to-machine communications application entity (Machine-to-Machine Communications Application Entity, M2M AE) communicates with a machine-to-machine communications common services entity (Machine-to-Machine Communications Common Services Entity, M2M CSE) by using a reference point X. CSFs communicate with each other according to the one M2M standard and by using a reference point Y. The CSE communicates with an underlying network service entity (Underlying Network Service Entity, NSE) by using a reference point Z.

At present, M2M communications may be based on a wired manner or a wireless manner, where the wireless manner includes cellular networks and short range, and a cellular network of the Third Generation Partnership Project (The 3rd Generation Partnership Project, 3GPP) is a manner widely used.

FIG. 2 is a diagram of a deployment scenario supported by one M2M. This scenario includes the following four forms: in a first case, an application dedicated node (Application Dedicated Node) is connected to an infrastructure node (infrastructure node) by using a reference point X; in a second case, an application dedicated node is connected to an infrastructure node by using a middle node (Middle Node); in a third case, an application service node (Application Service Node) is connected to an infrastructure node by using a middle node; in a fourth case, an application service node is connected to an infrastructure node by using a reference point Y.

FIG. 3 is a structural diagram of a CSE in one M2M, where a function of a data management repository (Data Management Repository, DMR) is mainly to collect data and analyze data.

The infrastructure node is an infrastructure node, and has a powerful DMR function, while the application service node and the middle node have only a limited DMR function due to their limited capabilities. Therefore, how to utilize the DMR function of the infrastructure node to improve efficiency of data sharing and analysis and process data of the application service node and the middle node needs to be further resolved.

SUMMARY

An objective of the present invention is to provide a data transmission method, so as to resolve a problem of how to utilize a DMR function of a network-side node to improve efficiency of data sharing and data analysis.

According to a first aspect, a data transmission method is provided, where the method includes:

acquiring, by a first device, a data transfer policy in a case in which the first device is registered with a second device; and sending, by the first device, data to the second device according to the data transfer policy, where the first device is a user-side node in machine-to-machine communications M2M, and the second device is an infrastructure node in M2M.

With reference to the first aspect, in a first possible implementation manner of the first aspect, the acquiring a data transfer policy in a case in which a first device is registered with a second device includes:

sending, by the first device to the second device, a request message for requesting the data transfer policy; and receiving a response message, sent by the second device, in response to the request message for requesting the data transfer policy, where the response message that is in response to the request message for requesting the data transfer policy carries the data transfer policy.

With reference to the first aspect, in a second possible implementation manner of the first aspect, the acquiring a data transfer policy in a case in which a first device is registered with a second device includes:

receiving a message sent by the second device, where the message carries the data transfer policy; and in a case in which the message sent by the second device is received, sending, to the second device, a response message that is in response to the message.

With reference to the first aspect, in a third possible implementation manner of the first aspect, the acquiring a data transfer policy in a case in which a first device is registered with a second device includes:

acquiring, by the first device, a prestored data transfer policy, and sending a message to the second device, where the message carries the data transfer policy; and receive a response message, sent by the second device, in response to the message.

With reference to the first aspect, the first possible implementation manner of the first aspect, the second possible implementation manner of the first aspect, or the third possible implementation manner of the first aspect, in a fourth possible implementation manner of the first aspect, the data transfer policy includes at least one type of information in the following information:

information about a data sending period, and a trigger condition for sending data, where the information about a data sending period is used to indicate that the first device sends data to the second device in a preset period; and the trigger condition for sending data is used to indicate that the first device sends data to the second device when the trigger condition is satisfied; and the trigger condition includes at least one of the following conditions:

in a case in which a DMR data volume in the first device exceeds a preset DMR data volume, the first device sends data to the second device; and in a case in which the first device receives data of a preset particular data type, the first device sends data to the second device.

With reference to the fourth possible implementation manner of the first aspect, in a fifth possible implementation manner of the first aspect, the data transfer policy further includes at least one type of information in the following information:

a data type of data to be sent, a data size of data to be sent, and a destination address to which data is sent, where the data type of data to be sent includes at least one of the following data types:

time information, application data, subscription information, location information, device information device information, semantic information, communication status, and access permission.

With reference to the fourth possible implementation manner of the first aspect or the fifth possible implementation manner of the first aspect, in a sixth possible implementation manner of the first aspect, the method further includes:

sending, by the first device to the second device, a first request message for subscribing to the data transfer policy;

receiving, by the first device, a response message, sent by the second device, in response to the first request message;

in a case in which the data transfer policy is updated, receiving a message sent by the second device, where the message is used to indicate, to the first device, that the data transfer policy is updated;

sending, by the first device, a second request message to the second device, where the second request is used to acquire, from the second device, the data transfer policy that is updated; and receiving, by the first device, a response message, sent by the second device, in response to the second request message, where the response message that is in response to the second request message carries the updated data transfer policy.

With reference to the fourth possible implementation manner of the first aspect or the fifth possible implementation manner of the first aspect, in a seventh possible implementation manner of the first aspect, the method further includes:

in a case in which the data transfer policy is updated, receiving a message sent by the second device, where the message carries the updated data transfer policy; and sending, by the first device to the second device, a response message that is in response to the message.

According to a second aspect, a data transmission method is provided, where the method includes:

acquiring, when a first device is registered with a second device and a data transfer policy stored in the first device and a data transfer policy on the second device are updated, the updated data transfer policy; and sending, by the first device, data to the second device according to the data transfer policy, where the first device is a user-side node in machine-to-machine communications M2M, and the second device is an infrastructure node in M2M.

With reference to the second aspect, in a first possible implementation manner of the second aspect, the acquiring, when a first device is registered with a second device and a data transfer policy stored in the first device and a data transfer policy on the second device are updated, the updated data transfer policy includes:

sending, by the first device to the second device, a first request message for subscribing to the data transfer policy;

receiving, by the first device, a response message, sent by the second device, in response to the first request message;

in a case in which the data transfer policy is updated, sending, by the second device, a message to the first device, where the message is used to indicate, to the first device, that the data transfer policy is updated;

sending, by the first device to the second device, a second request message for requesting the updated data transfer policy; and receiving, by the first device, a response message, sent by the second device, in response to the second request message, where the response message that is in response to the second request message carries the updated data transfer policy.

With reference to the second aspect, in a second possible implementation manner of the second aspect, the acquiring, when a first device is registered with a second device and a data transfer policy stored in the first device and a data transfer policy on the second device are updated, the updated data transfer policy includes:

in a case in which the data transfer policy is updated, receiving a message sent by the second device, where the message carries the updated data transfer policy; and sending, by the first device to the second device, a response message that is in response to the message.

With reference to the second aspect, the first possible implementation manner of the second aspect, or the second possible implementation manner of the second aspect, in a third possible implementation manner of the second aspect, the data transfer policy includes at least one type of information in the following information:

information about a data sending period, and a trigger condition for sending data, where the information about a data sending period is used to indicate that the first device sends data to the second device in a preset period; and the trigger condition for sending data is used to indicate that the first device sends data to the second device when the trigger condition is satisfied; and the trigger condition includes at least one of the following conditions:

in a case in which a DMR data volume in the first device exceeds a preset DMR data volume, the first device sends data to the second device; and in a case in which the first device receives data of a preset particular data type, the first device sends data to the second device.

With reference to the third possible implementation manner of the second aspect, in a fourth possible implementation manner of the second aspect, the data transfer policy further includes at least one type of information in the following information:

a data type of data to be sent, a data size of data to be sent, and a destination address to which data is sent, where the data type of data to be sent includes at least one of the following data types:

time information, application data, subscription information, location information, device information, semantic information, communication status, and access permission.

According to a third aspect, a data transmission method is provided, where the method includes:

acquiring, by a second device, a data transfer policy in a case in which a first device is registered with the second device; and receiving, by the second device according to the data transfer policy, data sent by the first device, where the first device is a user-side node in machine-to-machine communications M2M, and the second device is an infrastructure node in M2M.

With reference to the third aspect, in a first possible implementation manner of the third aspect, the acquiring, by a second device, a data transfer policy in a case in which a first device is registered with the second device includes:

acquiring, by the second device, a prestored data transfer policy;

receiving, by the second device, a request message that is sent by the first device and that requests the data transfer policy; and sending, by the second device to the first device, a response message that is in response to the request message for requesting the data transfer policy, where the response message that is in response to the request message for requesting the data transfer policy carries the data transfer policy.

With reference to the third aspect, in a second possible implementation manner of the third aspect, the acquiring, by a second device, a data transfer policy in a case in which a first device is registered with the second device includes:

acquiring, by the second device, a prestored data transfer policy;

sending, by the second device, a message to the first device, where the message carries the data transfer policy; and receiving, by the second device, a response message, sent by the first device, in response to the message.

With reference to the third aspect, in a third possible implementation manner of the third aspect, the acquiring, by a second device, a data transfer policy in a case in which a first device is registered with the second device includes:

receiving, by the second device, a message sent by the first device, where the message carries the data transfer policy; and sending, by the second device to the first device, a response message that is in response to the message.

With reference to the third aspect, the first possible implementation manner of the third aspect, the second possible implementation manner of the third aspect, or the third possible implementation manner of the third aspect, in a fourth possible implementation manner of the third aspect, the data transfer policy includes at least one type of information in the following information:

information about a data sending period, and a trigger condition for sending data, where the information about a data sending period is used to indicate that the first device sends data to the second device in a preset period; and the trigger condition for sending data is used to indicate that the first device sends data to the second device when the trigger condition is satisfied; and the trigger condition includes at least one of the following conditions:

in a case in which a DMR data volume in the first device exceeds a preset DMR data volume, the first device sends data to the second device; and in a case in which the first device receives data of a preset particular data type, the first device sends data to the second device.

With reference to the fourth possible implementation manner of the third aspect, in a fifth possible implementation manner of the third aspect, the data transfer policy further includes at least one type of information in the following information:

a data type of data to be sent, a data size of data to be sent, and a destination address to which data is sent, where the data type of data to be sent includes at least one of the following data types:

time information, application data, subscription information, location information, device information, semantic information, communication status, and access permission.

With reference to the fourth possible implementation manner of the third aspect or the fifth possible implementation manner of the third aspect, in a sixth possible implementation manner of the third aspect, the method further includes:

receiving, by the second device, a first request message, sent by the first device, for subscribing to the data transfer policy;

sending, by the second device to the first device, a response message that is in response to the first request message;

in a case in which the data transfer policy is updated, sending a message to the first device, where the message is used to indicate, to the first device, that the data transfer policy is updated;

receiving, by the second device, a second request message sent by the first device, where the second request is used to acquire, from the second device, the updated data transfer policy; and sending, by the second device to the first device, a response message that is in response to the second request message, where the response message that is in response to the second request message carries the updated data transfer policy.

With reference to the fourth possible implementation manner of the third aspect or the fifth possible implementation manner of the third aspect, in a seventh possible implementation manner of the third aspect, the method further includes:

receiving, by the second device, a message sent by the first device, where the message carries the data transfer policy; and sending, by the second device to the first device, a response message that is in response to the message.

According to a fourth aspect, a data transmission method is provided, where the method includes:

acquiring, by a second device, a data transfer policy in a case in which a first device is registered with the second device; and receiving, by the second device according to the data transfer policy, data sent by the first device, where the first device is a user-side node in machine-to-machine communications M2M, and the second device is an infrastructure node in M2M.

With reference to the fourth aspect, in a first possible implementation manner of the fourth aspect, the acquiring, when a first device is registered with a second device and a data transfer policy stored in the first device and a data transfer policy on the second device are updated, the updated data transfer policy includes:

receiving, by the second device, a first request message, sent by the first device, for subscribing to the data transfer policy;

sending, by the second device to the first device, a response message that is in response to the first request message;

in a case in which the data transfer policy is updated, sending a message to the first device, where the message is used to indicate, to the first device, that the data transfer policy is updated;

receiving, by the second device, a second request message sent by the first device, where the second request is used to acquire, from the second device, the updated data transfer policy; and sending, by the second device to the first device, a response message that is in response to the second request message, where the response message that is in response to the second request message carries the updated data transfer policy.

With reference to the fourth aspect, in a second possible implementation manner of the fourth aspect, the acquiring, when a first device is registered with a second device and a data transfer policy stored in the first device and a data transfer policy on the second device are updated, the updated data transfer policy includes:

in a case in which the data transfer policy is updated, sending, by the second device, a message to the first device, where the message carries the updated data transfer policy; and receiving, by the second device, a response message, sent by the first device, in response to the message.

With reference to the fourth aspect, the first possible implementation manner of the fourth aspect, or the second possible implementation manner of the fourth aspect, in a third possible implementation manner of the fourth aspect, the data transfer policy includes at least one type of information in the following information:

information about a data sending period, and a trigger condition for sending data, where the information about a data sending period is used to indicate that the first device sends data to the second device in a preset period; and the trigger condition for sending data is used to indicate that the first device sends data to the second device when the trigger condition is satisfied; and the trigger condition includes at least one of the following conditions:

in a case in which a DMR data volume in the first device exceeds a preset DMR data volume, the first device sends data to the second device; and in a case in which the first device receives data of a preset particular data type, the first device sends data to the second device.

With reference to the third possible implementation manner of the fourth aspect, in a fourth possible implementation manner of the fourth aspect, the data transfer policy further includes at least one type of information in the following information:

a data type of data to be sent, a data size of data to be sent, and a destination address to which data is sent, where the data type of data to be sent includes at least one of the following data types:

time information, application data, subscription information, location information, device information, semantic information, communication status, and access permission.

According to a fifth aspect, the user equipment includes:

an acquiring unit, configured to acquire a data transfer policy in a case in which a first device is registered with a second device; and a sending unit, configured to send data to the second device according to the data transfer policy, where the first device is a user-side node in machine-to-machine communications M2M, and the second device is an infrastructure node in M2M.

With reference to the fifth aspect, in a first possible implementation manner of the fifth aspect, the acquiring unit is specifically configured to:

send, to the second device, a request message for requesting the data transfer policy; and receive a response message, sent by the second device, in response to the request message for requesting the data transfer policy, where the response message that is in response to the request message for requesting the data transfer policy carries the data transfer policy.

With reference to the fifth aspect, in a second possible implementation manner of the fifth aspect, the acquiring unit is specifically configured to:

receive a message sent by the second device, where the message carries the data transfer policy; and in a case in which the message sent by the second device is received, send, to the second device, a response message that is in response to the message.

With reference to the fifth aspect, in a third possible implementation manner of the fifth aspect, the acquiring unit is specifically configured to:

acquire a prestored data transfer policy, and send a message to the second device, where the message carries the data transfer policy; and receive a response message, sent by the second device, in response to the message.

With reference to the fifth aspect, the first possible implementation manner of the fifth aspect, the second possible implementation manner of the fifth aspect, or the third possible implementation manner of the fifth aspect, in a fourth possible implementation manner of the fifth aspect, the data transfer policy includes at least one type of information in the following information:

information about a data sending period, and a trigger condition for sending data, where the information about a data sending period is used to indicate that the first device sends data to the second device in a preset period; and the trigger condition for sending data is used to indicate that the first device sends data to the second device when the trigger condition is satisfied; and the trigger condition includes at least one of the following conditions:

in a case in which a DMR data volume in the first device exceeds a preset DMR data volume, the first device sends data to the second device; and in a case in which the first device receives data of a preset particular data type, the first device sends data to the second device.

With reference to the fourth possible implementation manner of the fifth aspect, in a fifth possible implementation manner of the fifth aspect, the data transfer policy further includes at least one type of information in the following information:

a data type of data to be sent, a data size of data to be sent, and a destination address to which data is sent, where the data type of data to be sent includes at least one of the following data types:

time information, application data, subscription information, location information, device information, semantic information, communication status, and access permission.

With reference to the fourth possible implementation manner of the fifth aspect or the fifth possible implementation manner of the fifth aspect, in a sixth possible implementation manner of the fifth aspect, the sending unit is further configured to:

send, to the second device, a first request message for subscribing to the data transfer policy; and the receiving unit is specifically configured to:

receive a response message, sent by the second device, in response to the first request message;

in a case in which the data transfer policy is updated, receive a message sent by the second device, where the message is used to indicate, to the first device, that the data transfer policy is updated;

the sending unit is specifically configured to:

send a second request message to the second device, where the second request is used to acquire, from the second device, the updated data transfer policy; and the receiving unit is specifically configured to:

receive a response message, sent by the second device, in response to the second request message, where the response message that is in response to the second request message carries the updated data transfer policy.

With reference to the fourth possible implementation manner of the fifth aspect or the fifth possible implementation manner of the fifth aspect, in a seventh possible implementation manner of the fifth aspect, the receiving unit is further configured to:

in a case in which the data transfer policy is updated, receive a message sent by the second device, where the message carries the updated data transfer policy; and the sending unit is specifically configured to:

send, by the first device to the second device, a response message that is in response to the message.

According to a sixth aspect, user equipment is provided, where the user equipment includes:

an acquiring unit, configured to: when a first device is registered with a second device and a data transfer policy stored in the first device and a data transfer policy on the second device are updated, acquire the updated data transfer policy; and a sending unit, configured to send data to the second device according to the data transfer policy, where the first device is a user-side node in machine-to-machine communications M2M, and the second device is an infrastructure node in M2M.

With reference to the sixth aspect, in a first possible implementation manner of the sixth aspect, the acquiring unit is specifically configured to:

send, to the second device, a first request message for subscribing to the data transfer policy;

receive a response message, sent by the second device, in response to the first request message;

in a case in which the data transfer policy is updated, receive a message sent by the second device, where the message is used to indicate, to the first device, that the data transfer policy is updated;

send, to the second device, a second request message for requesting the updated data transfer policy; and receive a response message, sent by the second device, in response to the second request message, where the response message that is in response to the second request message carries the updated data transfer policy.

With reference to the sixth aspect, in a second possible implementation manner of the sixth aspect, the acquiring unit is specifically configured to:

in a case in which the data transfer policy is updated, receive a message sent by the second device, where the message carries the updated data transfer policy; and send, to the second device, a response message that is in response to the message.

With reference to the sixth aspect, the first possible implementation manner of the sixth aspect, or the second possible implementation manner of the sixth aspect, in a third possible implementation manner of the sixth aspect, the data transfer policy includes at least one type of information in the following information:

information about a data sending period, and a trigger condition for sending data, where the information about a data sending period is used to indicate that the first device sends data to the second device in a preset period; and the trigger condition for sending data is used to indicate that the first device sends data to the second device when the trigger condition is satisfied; and the trigger condition includes at least one of the following conditions:

in a case in which a DMR data volume in the first device exceeds a preset DMR data volume, the first device sends data to the second device; and in a case in which the first device receives data of a preset particular data type, the first device sends data to the second device.

With reference to the third possible implementation manner of the sixth aspect, in a fourth possible implementation manner of the sixth aspect, the data transfer policy further includes at least one type of information in the following information:

a data type of data to be sent, a data size of data to be sent, and a destination address to which data is sent, where the data type of data to be sent includes at least one of the following data types:

time information, application data, subscription information, location information, device information, semantic information, communication status, and access permission.

According to a seventh aspect, a network device is provided, where the network device includes:

an acquiring unit, configured to acquire a data transfer policy in a case in which a first device is registered with a second device; and a receiving unit, configured to receive, according to the data transfer policy, data sent by the first device, where the first device is a user-side node in machine-to-machine communications M2M, and the second device is an infrastructure node in M2M.

With reference to the seventh aspect, in a first possible implementation manner of the seventh aspect, the acquiring unit is specifically configured to:

acquire a prestored data transfer policy;

receive a request message that is sent by the first device and that requests the data transfer policy; and send, to the first device, a response message that is in response to the request message for requesting the data transfer policy, where the response message that is in response to the request message for requesting the data transfer policy carries the data transfer policy.

With reference to the seventh aspect, in a second possible implementation manner of the seventh aspect, the acquiring unit is specifically configured to:

acquire a prestored data transfer policy;

send a message to the first device, where the message carries the data transfer policy; and receive a response message, sent by the first device, in response to the message.

With reference to the seventh aspect, in a third possible implementation manner of the seventh aspect, the acquiring unit is specifically configured to:

receive a message sent by the first device, where the message carries the data transfer policy; and send, to the first device, a response message that is in response to the message.

With reference to the seventh aspect, the first possible implementation manner of the seventh aspect, the second possible implementation manner of the seventh aspect, or the third possible implementation manner of the seventh aspect, in a fourth possible implementation manner of the seventh aspect, the data transfer policy includes at least one type of information in the following information:

the data transfer policy includes at least one type of information in the following information:

information about a data sending period, and a trigger condition for sending data, where the information about a data sending period is used to indicate that the first device sends data to the second device in a preset period; and the trigger condition for sending data is used to indicate that the first device sends data to the second device when the trigger condition is satisfied; and the trigger condition includes at least one of the following conditions:

in a case in which a DMR data volume in the first device exceeds a preset DMR data volume, the first device sends data to the second device; and in a case in which the first device receives data of a preset particular data type, the first device sends data to the second device.

With reference to the fourth possible implementation manner of the seventh aspect, in a fifth possible implementation manner of the seventh aspect, the data transfer policy further includes at least one type of information in the following information:

a data type of data to be sent, a data size of data to be sent, and a destination address to which data is sent, where the data type of data to be sent includes at least one of the following data types:

time information, application data, subscription information, location information, device information, semantic information, communication status, and access permission.

With reference to the fourth possible implementation manner of the seventh aspect or the fifth possible implementation manner of the seventh aspect, in a sixth possible implementation manner of the seventh aspect, the receiving unit is specifically configured to:

receive a first request message, sent by the first device, for subscribing to the data transfer policy;

the network device further includes a sending unit, and the sending unit is specifically configured to:

send, to the first device, a response message that is in response to the first request message;

in a case in which the data transfer policy is updated, send a message to the first device, where the message is used to indicate, to the first device, that the data transfer policy is updated;

the receiving unit is specifically configured to:

receive a second request message sent by the first device, where the second request is used to acquire, from the second device, the updated data transfer policy; and the sending unit is specifically configured to:

send, to the first device, a response message that is in response to the second request message, where the response message that is in response to the second request message carries the updated data transfer policy.

With reference to the fourth possible implementation manner of the seventh aspect or the fifth possible implementation manner of the seventh aspect, in a seventh possible implementation manner of the seventh aspect, the sending unit is further configured to:

in a case in which the data transfer policy is updated, send a message to the first device, where the message carries the updated data transfer policy; and the receiving unit is specifically configured to:

receive a response message, sent by the first device, in response to the message.

According to an eighth aspect, a network device is provided, where the network device includes:

an acquiring unit, configured to: when a first device is registered with a second device and a data transfer policy stored in the first device and a data transfer policy on the second device are updated, acquire the updated data transfer policy; and a receiving unit, configured to receive, according to the data transfer policy, data sent by the first device, where the first device is a user-side node in machine-to-machine communications M2M, and the second device is an infrastructure node in M2M.

With reference to the eighth aspect, in a first possible implementation manner of the eighth aspect, the acquiring unit is specifically configured to:

receive a first request message, sent by the first device, for subscribing to the data transfer policy;

send, to the first device, a response message that is in response to the first request message;

in a case in which the data transfer policy is updated, send a message to the first device, where the message is used to indicate, to the first device, that the data transfer policy is updated;

receive a second request message sent by the first device, where the second request is used to acquire, from the second device, the updated data transfer policy; and send, to the first device, a response message that is in response to the second request message, where the response message that is in response to the second request message carries the updated data transfer policy.

With reference to the eighth aspect, in a second possible implementation manner of the eighth aspect, the acquiring unit is specifically configured to:

in a case in which the data transfer policy is updated, send a message to the first device, where the message carries the updated data transfer policy; and receive a response message, sent by the first device, in response to the message.

With reference to the eighth aspect, the first possible implementation manner of the eighth aspect, or the second possible implementation manner of the eighth aspect, in a third possible implementation manner of the eighth aspect, the data transfer policy includes at least one type of information in the following information:

information about a data sending period, and a trigger condition for sending data, where the information about a data sending period is used to indicate that the first device sends data to the second device in a preset period; and the trigger condition for sending data is used to indicate that the first device sends data to the second device when the trigger condition is satisfied; and the trigger condition includes at least one of the following conditions:

in a case in which a DMR data volume in the first device exceeds a preset DMR data volume, the first device sends data to the second device; and in a case in which the first device receives data of a preset particular data type, the first device sends data to the second device.

With reference to the third possible implementation manner of the eighth aspect, in a fourth possible implementation manner of the eighth aspect, the data transfer policy further includes at least one type of information in the following information:

a data type of data to be sent, a data size of data to be sent, and a destination address to which data is sent, where the data type of data to be sent includes at least one of the following data types:

time information, application data, subscription information, location information, device information, semantic information, communication status, and access permission.

Compared with the prior art, the present invention provides a network device. In a case in which a first device is registered with a second device, the first device acquires a data transfer policy; and the first device sends data to the second device according to the data transfer policy, so that the network device improves efficiency of data sharing and data analysis by means of a DMR function of a network-side node.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

To make the objectives, technical solutions, and advantages of the present invention clearer and more comprehensible, the following further describes the present invention in detail with reference to the accompanying drawings and embodiments. It should be understood that this specific embodiments described herein are merely used to explain the present invention but are not intended to limit the present invention.

The following descriptions are merely exemplary embodiments of the present invention, but are not intended to limit the present invention. Any modification, equivalent replacement, or improvement made without departing from the spirit and principle of the present invention should fall within the protection scope of the present invention.

Figure 1:
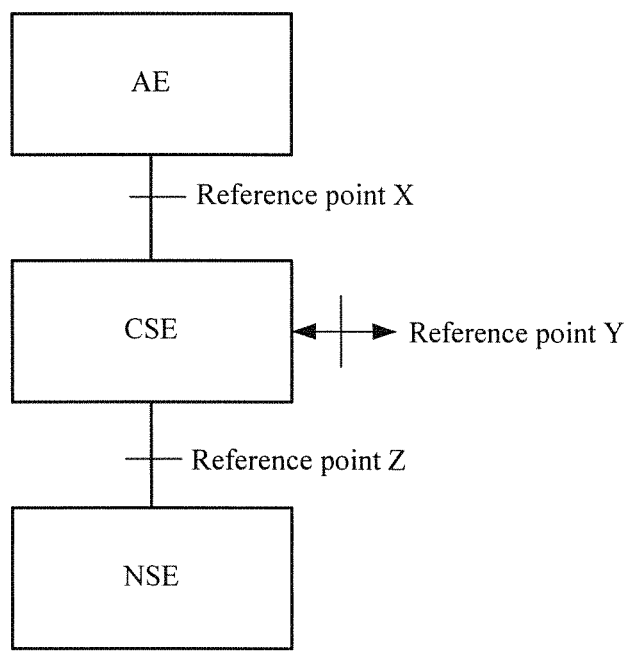
FIG. 1 is an architectural diagram of one M2M.
Figure 2:
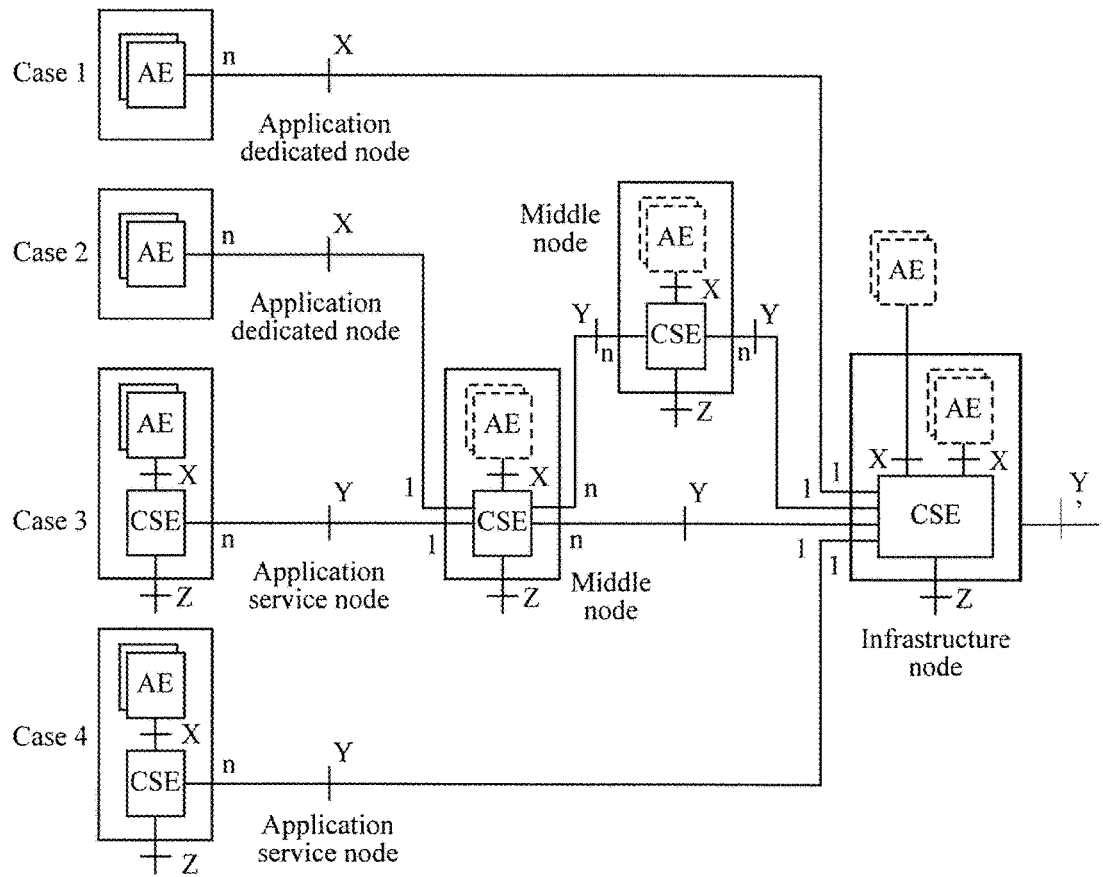
FIG. 2 is a diagram of a deployment scenario supported by one M2M.
Figure 3:
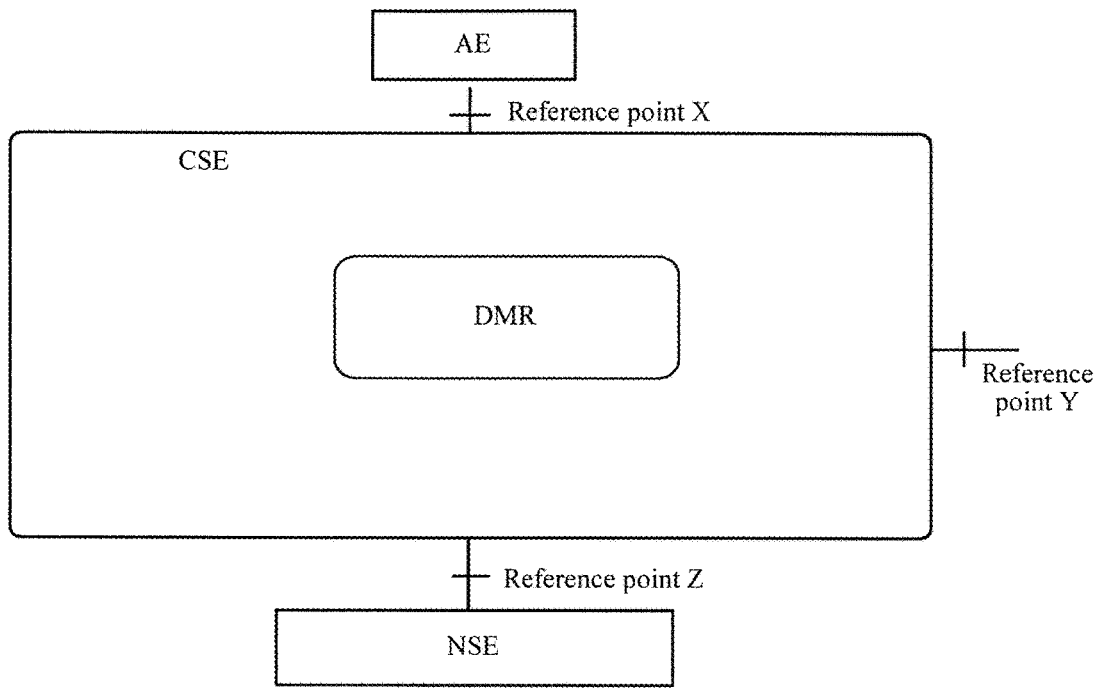
FIG. 3 is a structural diagram of a CSE in one M2M.
Figure 4:
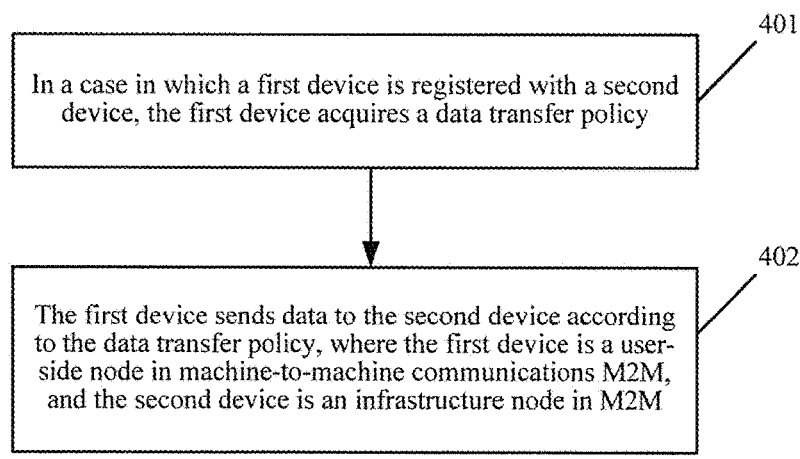
FIG. 4 is a flowchart of a data transmission method according to an embodiment of the present invention.

Referring to FIG. 4, FIG. 4 is a flowchart of a data transmission method according to an embodiment of the present invention. As shown in FIG. 4, the method includes:

Step 401: In a case in which a first device is registered with a second device, the first device acquires a data transfer policy, where the first device is a user-side node in machine-to-machine communications M2M, and the second device is an infrastructure node in M2M.

The first device may be an application service node or a middle node, and the second device is an infrastructure node.

Step 402: The first device sends data to the second device according to the data transfer policy.

Optionally, the acquiring a data transfer policy in a case in which a first device is registered with a second device includes:

sending, by the first device to the second device, a request message for requesting the data transfer policy; and receiving a response message, sent by the second device, in response to the request message for requesting the data transfer policy, where the response message that is in response to the request message for requesting the data transfer policy carries the data transfer policy.

Figure 5:
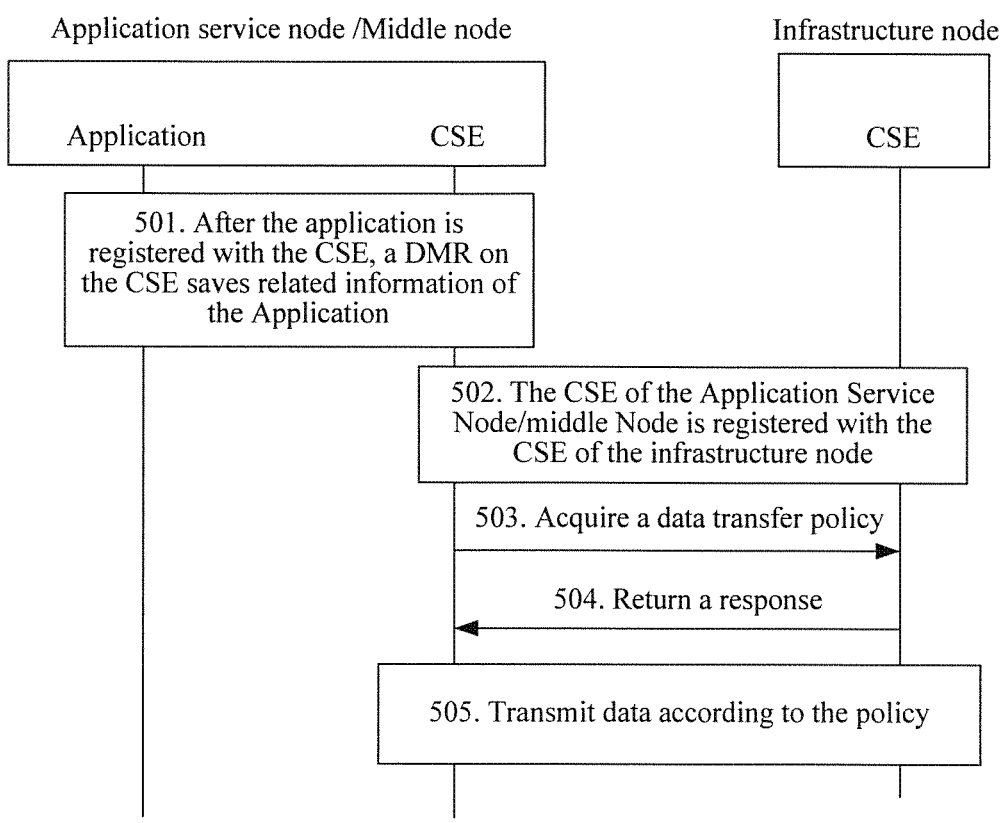
FIG. 5 is a flowchart of a data transmission method according to an embodiment of the present invention.

Specifically, referring to FIG. 5, FIG. 5 is a flowchart of a data transmission method according to an embodiment of the present invention. As shown in FIG. 5, Step 501: Applications on an application service node/a middle node are registered with a local CSE, and a DMR of the local CSE saves related information about the applications and related information on the CSE.

Step 502: The CSE of the application service node/middle node is registered with a CSE of an infrastructure node.

Step 503: The infrastructure node receives information, sent by the application service node/middle node, for requesting the data transfer policy, that is, the infrastructure node receives a request message, sent by the application service node/middle node, for requesting a data transfer policy, and the infrastructure node sends the data transfer policy to the applications on the application service node/middle node.

Optionally, the data transfer policy includes at least one type of information in the following information:

information about a data sending period, and a trigger condition for sending data, where the information about a data sending period is used to indicate that the first device sends data to the second device in a preset period; and the trigger condition for sending data is used to indicate that the first device sends data to the second device when the trigger condition is satisfied.

Specifically, the information about a data sending period may be one hour, or the like.

The trigger condition includes at least one of the following conditions:

in a case in which a DMR data volume in the first device exceeds a preset DMR data volume, the first device sends data to the second device; and in a case in which the first device receives data of a preset particular data type, the first device sends data to the second device.

Specifically, the trigger condition for sending data may be at least one of the following conditions, but is not limited to the conditions listed in the following:

reporting data when a volume of sent DMR data in the CSE of the Application Service node/Middle node exceeds a particular volume; performing reporting when data of the Application is updated; and reporting data when an event such as performing data transmission when particular data is received occurs.

Alternatively, a manner of combining the information about a data sending period and the trigger condition for sending data may be used. When no event occurs, periodic reporting is performed, for example, a reporting period is one hour; an event may be set to "emergency", and when the event is set to "emergency", data can be reported to a network-side device in time without following an event reporting condition (period).

Further, the data transfer policy further includes at least one type of information in the following information:

a data type of data to be sent, a data size of data to be sent, and a destination address to which data is sent, where Specifically, the data size of data to be sent may be a maximum data length required by one time of data transmission. The destination address to which data is sent may be another address provided by the infrastructure node, and the another address may be one of an IP address and a uniform resource identifier (Uniform Resource Identifier, URI); the CSE of the Application Service node/Middle node may transmit data to the other address for saving.

The data type of data to be sent includes at least one of the following data types:

time information (create time, expiration time), Application data, subscription information, location information, device information, semantic information, communication status, and access permission.

Step 504: After receiving the data transfer policy sent by the infrastructure node, the CSE of the application service node/middle node sends, to the infrastructure node, a response message that is in response to a request message for requesting the data transfer policy.

Step 505: The CSE of the application service node/middle node sends, according to the foregoing policy, data to a DMR of the infrastructure node for saving.

Optionally, the acquiring a data transfer policy in a case in which a first device is registered with a second device includes:

receiving a message sent by the second device, where the message carries the data transfer policy; and in a case in which the message sent by the second device is received, sending, to the second device, a response message that is in response to the message.

Figure 6:
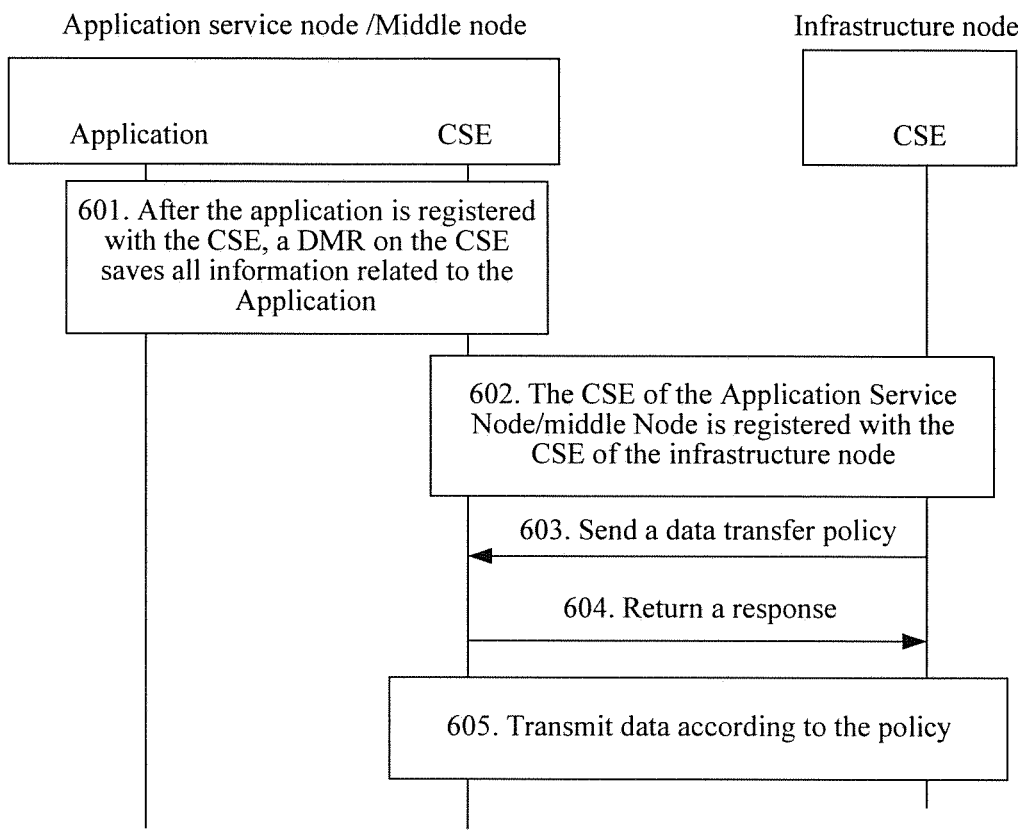
FIG. 6 is a flowchart of a data transmission method according to an embodiment of the present invention.

Specifically, referring to FIG. 6, FIG. 6 is a flowchart of a data transmission method according to an embodiment of the present invention.

Step 601: Applications on an application service node/a middle node are registered with a local CSE, and a DMR of the local CSE saves related information about the application and related information on the CSE.

Step 602: The CSE of the application service node/middle node is registered with a CSE of an infrastructure node.

Step 603: The infrastructure node sends a data transfer policy to the applications of the application service node/ middle node.

Step 604: After the infrastructure node completes sending the data transfer policy, the CSE of the application service node/middle node returns a response.

Step 605: The CSE of the application service node/middle node uploads, according to the foregoing policy, data to a DMR of the infrastructure node for saving.

Optionally, the acquiring a data transfer policy in a case in which a first device is registered with a second device includes:

acquiring, by the first device, a prestored data transfer policy, and sending a message to the second device, where the message carries the data transfer policy; and receiving a response message, sent by the second device, in response to the message.

Figure 7:
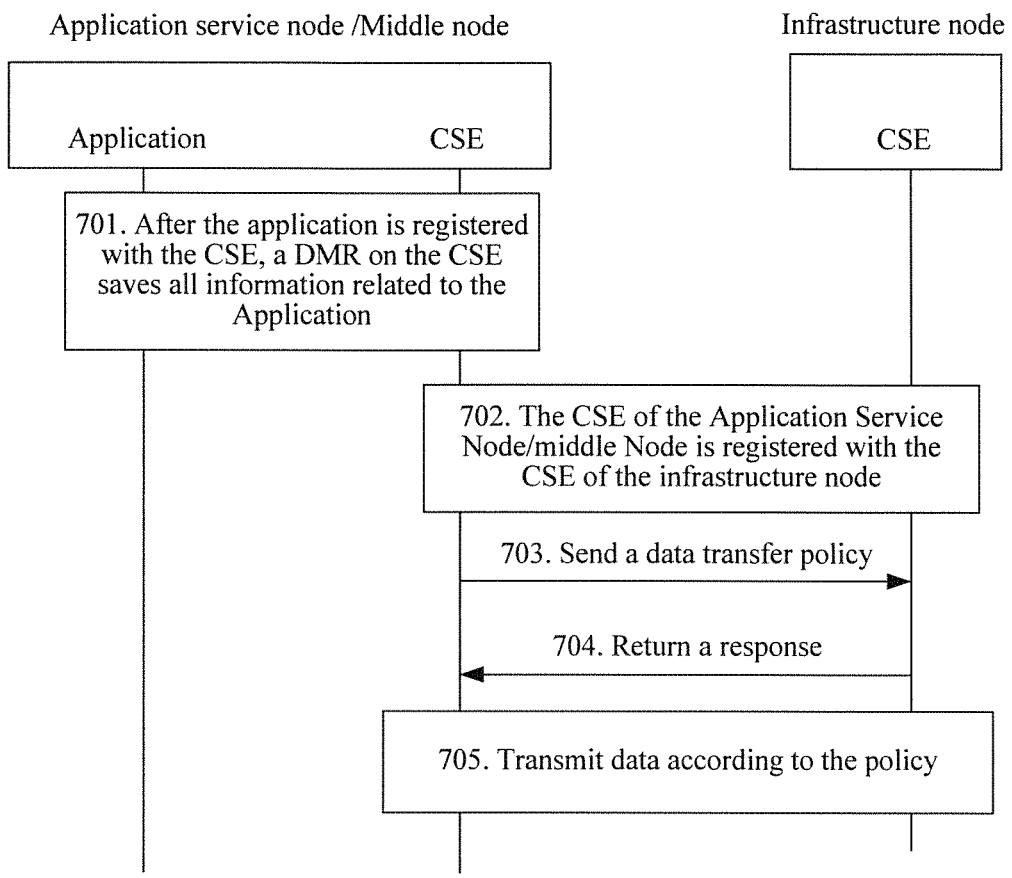
FIG. 7 is a flowchart of a data transmission method according to an embodiment of the present invention.

Specifically, referring to FIG. 7, FIG. 7 is a flowchart of a data transmission method according to an embodiment of the present invention.

Step 701: Applications on an application service node/a middle node are registered with a local CSE, and a DMR of the local CSE saves related information about the application and related information on the CSE.

Step 702: The CSE of the application service node/middle node is registered with a CSE of an infrastructure node.

Step 703: The application service node/middle node may send a data transfer policy to the infrastructure node.

Step 704: The Infrastructure node may negotiate, according to current load, a modification on a transmission parameter reported by the application service node/middle node; if the infrastructure node agrees on the data transfer policy in step 703, the infrastructure node returns a response; and if the infrastructure node modifies the data transfer policy in step 703, the infrastructure node returns a response that includes a modified data transmission parameter.

Step 705: The CSE of the application service node/middle node uploads, according to the foregoing policy, data to a DMR of the infrastructure node for saving.

Optionally, the method further includes:

sending, by the first device to the second device, a first request message for subscribing to the data transfer policy;

receiving, by the first device, a response message, sent by the second device, in response to the first request message;

in a case in which the data transfer policy is updated, receiving a message sent by the second device, where the message is used to indicate, to the first device, that the data transfer policy is updated;

sending, by the first device, a second request message to the second device, where the second request is used to acquire, from the second device, the data transfer policy that is updated; and receiving, by the first device, a response message, sent by the second device, in response to the second request message, where the response message that is in response to the second request message carries the updated data transfer policy.

Figure 8:
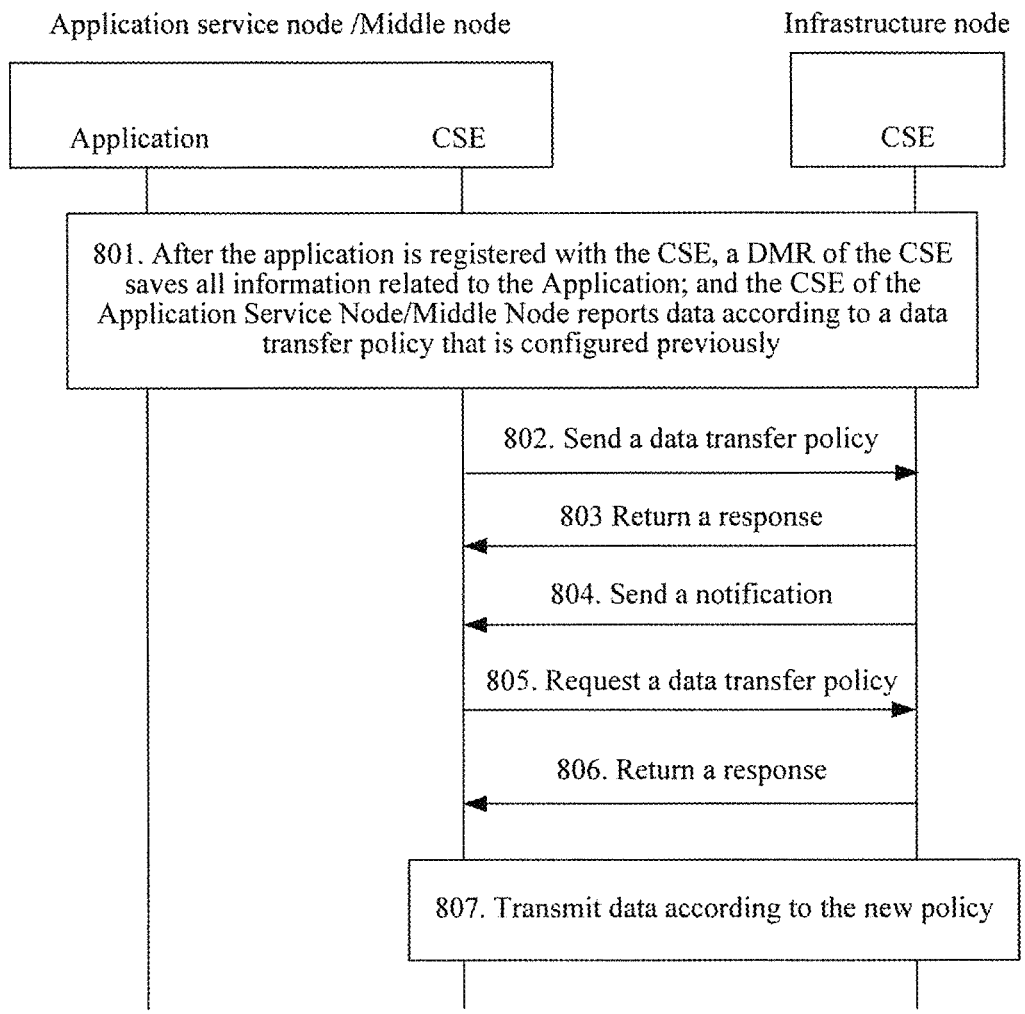
FIG. 8 is a flowchart of a data transmission method according to an embodiment of the present invention.

Specifically, referring to FIG. 8, FIG. 8 is a flowchart of a data transmission method according to an embodiment of the present invention. As shown in FIG. 8, Step 801: After an application is registered with a CSE, a DMR of the CSE saves all information related to the Application and related information of the CSE; and the CSE of an application service node/a middle node reports data according to a policy that is sent previously.

Step 802: The application service node/middle node subscribes to a data transfer policy (data transfer policy) on an infrastructure node by using a subscriber data transfer policy command, and obtains a notification when the data transfer policy changes.

Step 803: The infrastructure node returns a response.

Step 804: When the data transfer policy on the infrastructure node changes, the infrastructure node notifies the CSE of the application service node/middle node.

Step 805: The CSE of the application service node/middle node acquires a data sending policy on the CSE of the infrastructure node.

Step 806: The infrastructure node returns the data transfer policy.

Step 807: The CSE of the application service node/middle node uploads, according to the new data transfer policy, data to a DMR of the infrastructure node for saving.

It should be noted that, in step 805, the CSE of the application service node/middle node may send a data transfer policy of the application service node/middle node to the infrastructure node, and the infrastructure node adjusts the data transfer policy according to load or a policy of the infrastructure node and sends an adjusted data transfer policy to the application service node/middle node in step 806.

Optionally, the method further includes:

in a case in which the data transfer policy is updated, receiving a message sent by the second device, where the message carries the updated data transfer policy; and sending, by the first device to the second device, a response message that is in response to the message.

Figure 9:
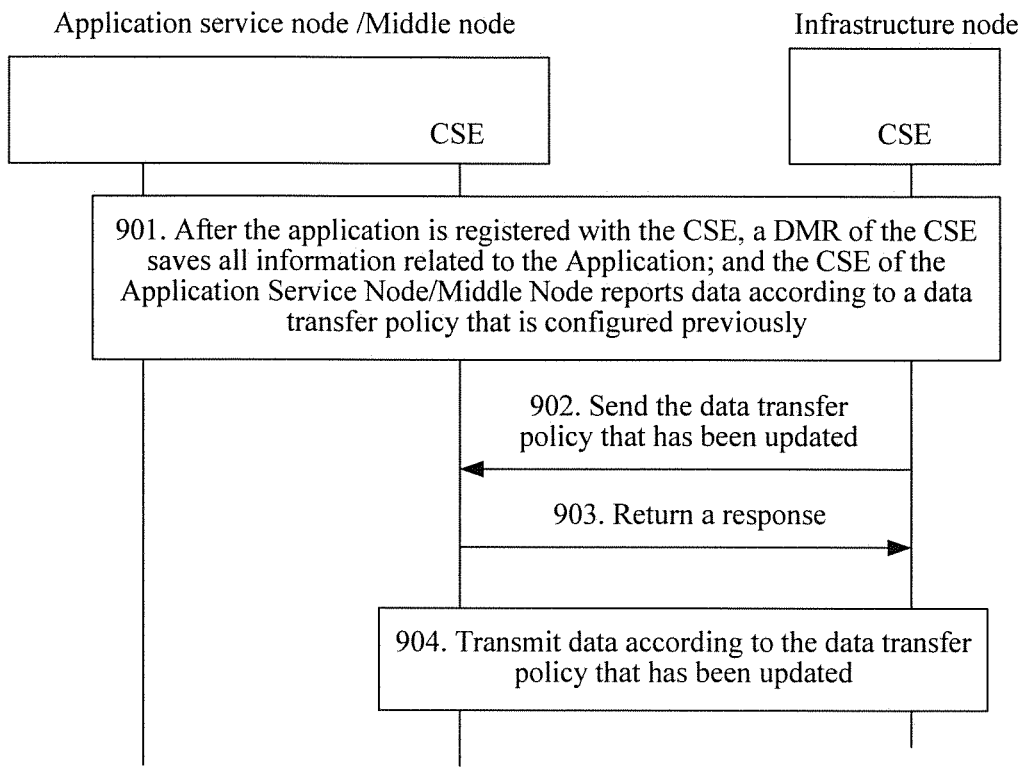
FIG. 9 is a flowchart of a data transmission method according to an embodiment of the present invention.

Specifically, referring to FIG. 9, FIG. 9 is a flowchart of a data transmission method according to an embodiment of the present invention. As shown in FIG. 9, Step 901: After an application is registered with a CSE, a DMR on the CSE saves all information related to the Application, and the CSE of an application service node/a middle node reports data according to a data transfer policy that is sent previously.

Step 902: Send a new data transfer policy to the CSE of the application service node/Middle node.

Step 903: After sending of the new transfer policy is completed, the CSE of the application service node/middle node returns a response.

Step 904: The CSE of the application service node/middle node uploads, according to the new data transfer policy, data to a DMR of an infrastructure node for saving.

The embodiments of the present invention provide a data transmission method. In the method, in a case in which a first device is registered with a second device, the first device acquires a data transfer policy; and the first device sends data to the second device according to the data transfer policy, so that efficiency of data sharing and data analysis is improved by means of a DMR function of a network-side node.

Figure 10:
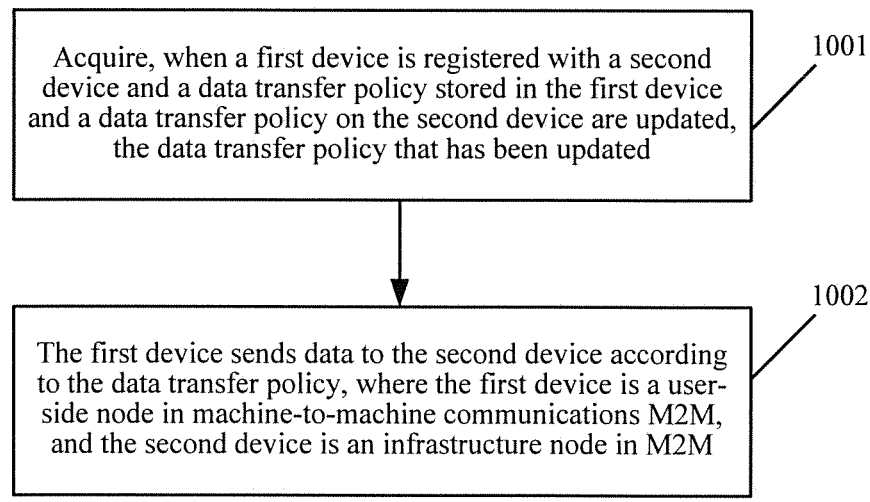
FIG. 10 is a flowchart of a data transmission method according to the present invention.

Referring to FIG. 10, FIG. 10 is a flowchart of a data transmission method according to the present invention. As shown in FIG. 10, the method includes the following steps:

Step 1001: Acquire, when a first device is registered with a second device and a data transfer policy stored in the first device and a data transfer policy on the second device are updated, the updated data transfer policy, where the first device is a user-side node in machine-to-machine communications M2M, and the second device is an infrastructure node in M2M.

Optionally, the acquiring, when a first device is registered with a second device and a data transfer policy stored in the first device and a data transfer policy on the second device are updated, the updated data transfer policy includes:

sending, by the first device to the second device, a first request message for subscribing to the data transfer policy;

receiving, by the first device, a response message, sent by the second device, in response to the first request message;

in a case in which the data transfer policy is updated, receiving, by the first device, a message sent by the second device, where the message is used to indicate, to the first device, that the data transfer policy is updated;

sending, by the first device to the second device, a second request message for requesting the updated data transfer policy; and receiving, by the first device, a response message, sent by the second device, in response to the second request message, where the response message that is in response to the second request message carries the updated data transfer policy.

Specifically, refer to the description of the method in FIG. 8, and details are not described herein again.

Optionally, the acquiring, when a first device is registered with a second device and a data transfer policy stored in the first device and a data transfer policy on the second device are updated, the updated data transfer policy includes:

in a case in which the data transfer policy is updated, receiving a message sent by the second device, where the message carries the updated data transfer policy; and sending, by the first device to the second device, a response message that is in response to the message.

Specifically, refer to the description of the method in FIG. 9, and details are not described herein again.

Optionally, the data transfer policy includes at least one type of information in the following information:

information about a data sending period, and a trigger condition for sending data, where the information about a data sending period is used to indicate that the first device sends data to the second device in a preset period; and the trigger condition for sending data is used to indicate that the first device sends data to the second device when the trigger condition is satisfied; and the trigger condition includes at least one of the following conditions:

in a case in which a DMR data volume in the first device exceeds a preset DMR data volume, the first device sends data to the second device; and in a case in which the first device receives data of a preset particular data type, the first device sends data to the second device.

Specifically, the information about a data sending period may be one hour, or the like.

The trigger condition includes at least one of the following conditions:

in a case in which a DMR data volume in the first device exceeds a preset DMR data volume, the first device sends data to the second device; and in a case in which the first device receives data of a preset particular data type, the first device sends data to the second device.

Specifically, the trigger condition for sending data may be at least one of the following conditions, but is not limited to the conditions listed in the following:

reporting data when a volume of sent DMR data in the CSE of the Application Service node/Middle node exceeds a particular volume; performing reporting when data of the Application is updated; and reporting data when an event such as performing data transmission when particular data is received occurs.

Alternatively, a manner of combining the information about a data sending period and the trigger condition for sending data may be used. When no event occurs, periodic reporting is performed, for example, a reporting period is one hour; an event may be set to "emergency", and when the event is set to "emergency", data can be reported to a network-side device in time without following an event reporting condition (period).

Further, the data transfer policy further includes at least one type of information in the following information:

a data type of data to be sent, a data size of data to be sent, and a destination address to which data is sent, where the data type of data to be sent includes at least one of the following data types:

time information, application data, subscription information, location information, device information, semantic information, communication status, and access permission.

Specifically, the data size of data to be sent may be a maximum data length required by one data transmission. The destination address to which data is sent may be another address provided by the infrastructure node, and the another address may be one of an IP address and a uniform resource identifier (Uniform Resource Identifier, URI); the CSE of the Application Service node/Middle node may transmit data to the other address for saving.

the data type of data to be sent includes at least one of the following data types:

time information (create time, expiration time), Application data, subscription information, location information, device information, semantic information, communication status, and access permission.

Step 1002: The first device sends data to the second device according to the data transfer policy.

This embodiment of the present invention provides a data transmission method and a device. In the method, in a case in which a first device is registered with a second device, the first device acquires a data transfer policy; and the first device sends data to the second device according to the data transfer policy, so that efficiency of data sharing and data analysis is improved by means of a DMR function of a network-side node.

Figure 11:
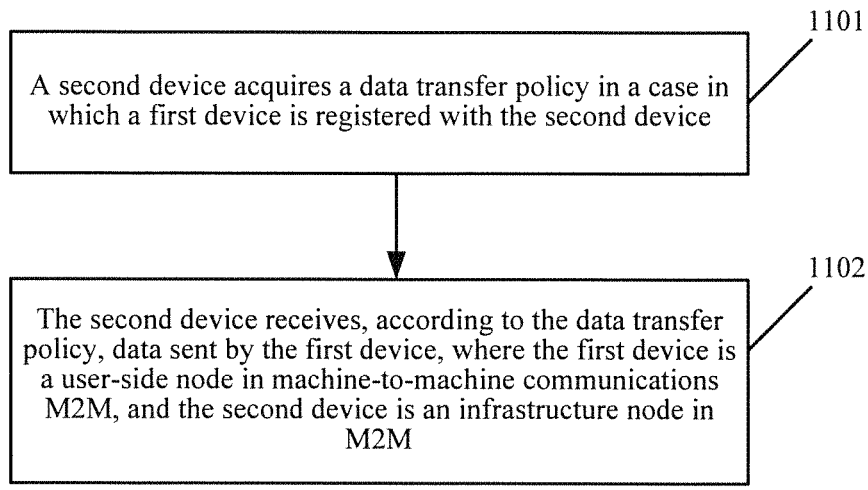
FIG. 11 is a flowchart of a data transmission method according to an embodiment of the present invention.

Referring to FIG. 11, FIG. 11 is a flowchart of a data transmission method according to an embodiment of the present invention. As shown in FIG. 11, the method includes:

Step 1101: A second device acquires a data transfer policy in a case in which a first device is registered with the second device, where the first device is a user-side node in machine-to-machine communications M2M, and the second device is an infrastructure node in M2M.

Step 1102: The second device receives, according to the data transfer policy, data sent by the first device.

Optionally, the acquiring, by a second device, a data transfer policy in a case in which a first device is registered with the second device includes:

acquiring, by the second device, a prestored data transfer policy;

receiving, by the second device, a request message that is sent by the first device and that requests the data transfer policy; and sending, by the second device to the first device, a response message that is in response to the request message for requesting the data transfer policy, where the response message that is in response to the request message for requesting the data transfer policy carries the data transfer policy.

Specifically, refer to the description in FIG. 5, and details are not described herein again.

Optionally, the acquiring, by a second device, a data transfer policy in a case in which a first device is registered with the second device includes:

acquiring, by the second device, a prestored data transfer policy;

sending, by the second device, a message to the first device, where the message carries the data transfer policy; and receiving, by the second device, a response message, sent by the first device, in response to the message.

Specifically, refer to the description in FIG. 6, and details are not described herein again.

Optionally, the acquiring, by a second device, a data transfer policy in a case in which a first device is registered with the second device includes:

receiving, by the second device, a message sent by the first device, where the message carries the data transfer policy; and sending, by the second device to the first device, a response message that is in response to the message.

Specifically, refer to the description in FIG. 7, and details are not described herein again.

Optionally, the data transfer policy includes at least one type of information in the following information:

information about a data sending period, and a trigger condition for sending data, where the information about a data sending period is used to indicate that the first device sends data to the second device in a preset period; and the trigger condition for sending data is used to indicate that the first device sends data to the second device when the trigger condition is satisfied; and the trigger condition includes at least one of the following conditions:

in a case in which a DMR data volume in the first device exceeds a preset DMR data volume, the first device sends data to the second device; and in a case in which the first device receives data of a preset particular data type, the first device sends data to the second device.

Further, the data transfer policy further includes at least one type of information in the following information:

a data type of data to be sent, a data size of data to be sent, and a destination address to which data is sent, where the data type of data to be sent includes at least one of the following data types:

time information, application data, subscription information, location information, device information device information, semantic information, communication status, and access permission.

Optionally, the method further includes:

receiving, by the second device, a first request message, sent by the first device, for subscribing to the data transfer policy;

sending, by the second device to the first device, a response message that is in response to the first request message;

in a case in which the data transfer policy is updated, sending a message to the first device, where the message is used to indicate, to the first device, that the data transfer policy is updated;

receiving, by the second device, a second request message sent by the first device, where the second request is used to acquire, from the second device, the updated data transfer policy; and sending, by the second device to the first device, a response message that is in response to the second request message, where the response message that is in response to the second request message carries the updated data transfer policy.

Specifically, refer to the description in FIG. 8, and details are not described herein again.

Optionally, the method further includes:

in a case in which the data transfer policy is updated, sending, by the second device, a message to the first device, where the message carries the updated data transfer policy; and receiving, by the second device, a response message, sent by the first device, in response to the message.

Specifically, refer to the description in FIG. 9, and details are not described herein again.

This embodiment of the present invention provides a data transmission method. In the method, in a case in which a first device is registered with a second device, the first device acquires a data transfer policy; and the first device sends data to the second device according to the data transfer policy, so that efficiency of data sharing and data analysis is improved by means of a DMR function of a network-side node.

Figure 12:
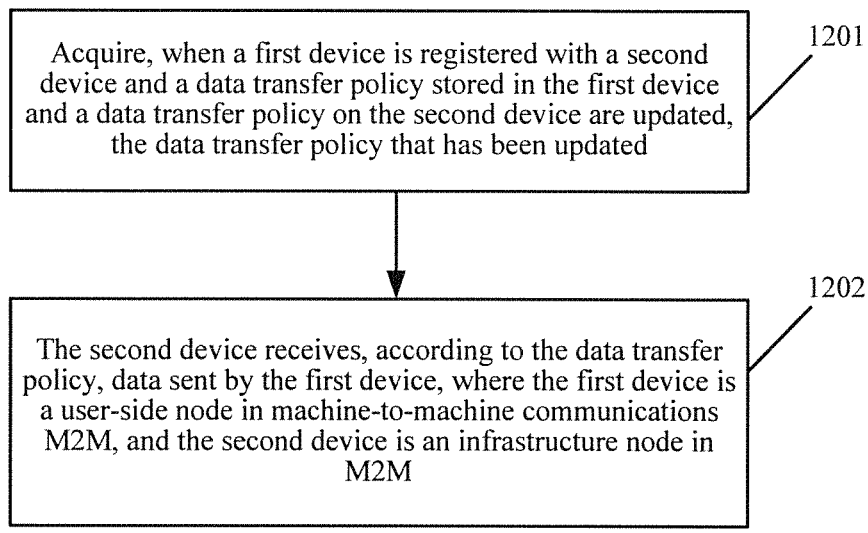
FIG. 12 is a flowchart of a data transmission method according to an embodiment of the present invention.

Referring to FIG. 12, FIG. 12 is a flowchart of a data transmission method according to an embodiment of the present invention. As shown in FIG. 12, the method includes:

Step 1201: Acquire, when a first device is registered with a second device and a data transfer policy stored in the first device and a data transfer policy on the second device are updated, the updated data transfer policy, where the first device is a user-side node in machine-to-machine communications M2M, and the second device is an infrastructure node in M2M.

Optionally, the acquiring, when a first device is registered with a second device and a data transfer policy stored in the first device and a data transfer policy on the second device are updated, the updated data transfer policy includes:

receiving, by the second device, a first request message, sent by the first device, for subscribing to the data transfer policy;

sending, by the second device to the first device, a response message that is in response to the first request message;

in a case in which the data transfer policy is updated, sending a message to the first device, where the message is used to indicate, to the first device, that the data transfer policy is updated;

receiving, by the second device, a second request message sent by the first device, where the second request is used to acquire, from the second device, the updated data transfer policy; and sending, by the second device to the first device, a response message that is in response to the second request message, where the response message that is in response to the second request message carries the updated data transfer policy.

Specifically, refer to the description in FIG. 8, and details are not described herein again.

Optionally, the acquiring, when a first device is registered with a second device and a data transfer policy stored in the first device and a data transfer policy on the second device are updated, the updated data transfer policy includes:

in a case in which the data transfer policy is updated, sending, by the second device, a message to the first device, where the message carries the updated data transfer policy; and receiving, by the second device, a response message, sent by the first device, in response to the message.

Specifically, refer to the description in FIG. 9, and details are not described herein again.

Optionally, the data transfer policy includes at least one type of information in the following information:

information about a data sending period, and a trigger condition for sending data, where the information about a data sending period is used to indicate that the first device sends data to the second device in a preset period; and the trigger condition for sending data is used to indicate that the first device sends data to the second device when the trigger condition is satisfied; and the trigger condition includes at least one of the following conditions:

in a case in which a DMR data volume in the first device exceeds a preset DMR data volume, the first device sends data to the second device; and in a case in which the first device receives data of a preset particular data type, the first device sends data to the second device.

The data transfer policy further includes at least one type of information in the following information:

a data type of data to be sent, a data size of data to be sent, and a destination address to which data is sent, where the data type of data to be sent includes at least one of the following data types:

time information, application data, subscription information, location information, device information, semantic information, communication status, and access permission.

Step 1202: The second device receives, according to the data transfer policy, data sent by the first device.

This embodiment of the present invention provides a data transmission method. In the method, in a case in which a first device is registered with a second device, the first device acquires a data transfer policy; and the first device sends data to the second device according to the data transfer policy, so that efficiency of data sharing and data analysis is improved by means of a DMR function of a network-side node.

Figure 13:
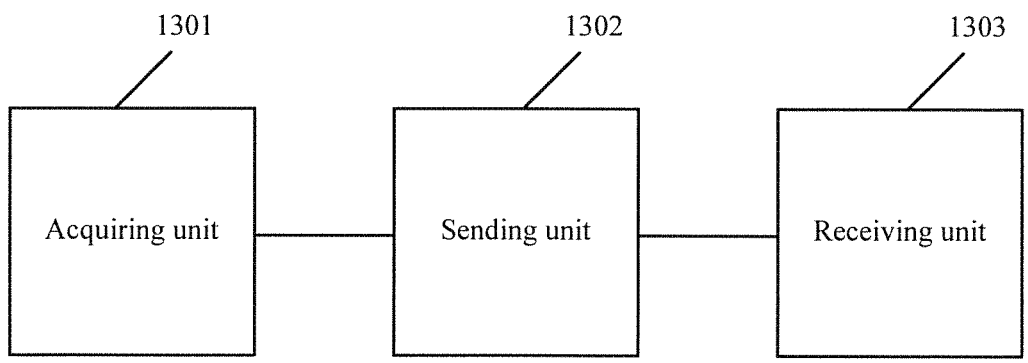
FIG. 13 is an apparatus structural diagram of user equipment according to an embodiment of the present invention.

Referring to FIG. 13, FIG. 13 is an apparatus structural diagram of user equipment according to an embodiment of the present invention. As shown in FIG. 13, the user equipment includes:

an acquiring unit 1301, configured to acquire a data transfer policy in a case in which a first device is registered with a second device, where the first device may be a CSE of an application service node or a middle node, and the second device is a common service entity (Common Service Entity, CSE) of an infrastructure node; and a sending unit 1302, configured to send data to the second device according to the data transfer policy, where the first device is a user-side node in machine-to-machine communications M2M, and the second device is an infrastructure node in M2M.

Optionally, the acquiring unit 1301 is specifically configured to:

send, to the second device, a request message for requesting the data transfer policy; and receive a response message, sent by the second device, in response to the request message for requesting the data transfer policy, where the response message that is in response to the request message for requesting the data transfer policy carries the data transfer policy.

Specifically, refer to the description in FIG. 5, and details are not described herein again.

Optionally, the acquiring unit 1301 is specifically configured to:

receive a message sent by the second device, where the message carries the data transfer policy; and in a case in which the message sent by the second device is received, send, to the second device, a response message that is in response to the message.

Specifically, refer to the description in FIG. 6, and details are not described herein again.

Optionally, the acquiring unit 1301 is specifically configured to:

acquire a prestored data transfer policy, and send a message to the second device, where the message carries the data transfer policy; and receive a response message, sent by the second device, in response to the message.

Specifically, refer to the description in FIG. 7, and details are not described herein again.

The data transfer policy includes at least one type of information in the following information:

information about a data sending period, and a trigger condition for sending data, where the information about a data sending period is used to indicate that the first device sends data to the second device in a preset period; and the trigger condition for sending data is used to indicate that the first device sends data to the second device when the trigger condition is satisfied; and the trigger condition includes at least one of the following conditions:

in a case in which a DMR data volume in the first device exceeds a preset DMR data volume, the first device sends data to the second device; and in a case in which the first device receives data of a preset particular data type, the first device sends data to the second device.

Further, the data transfer policy further includes at least one type of information in the following information:

a data type of data to be sent, a data size of data to be sent, and a destination address to which data is sent, where the data type of data to be sent includes at least one of the following data types: time information, application data, subscription information, location information, device information, semantic information, communication status, and access permission.

Optionally, the sending unit 1302 is further configured to:

send, to the second device, a first request message for subscribing to the data transfer policy.

The user equipment further includes a receiving unit 1303, and the receiving unit 1303 is specifically configured to:

receive a response message, sent by the second device, in response to the first request message; and in a case in which the data transfer policy is updated, receive a message sent by the second device, where the message is used to indicate, to the first device, that the data transfer policy is updated;

the sending unit 1302 is specifically configured to:

send a second request message to the second device, where the second request is used to acquire, from the second device, the updated data transfer policy; and the receiving unit 1303 is specifically configured to:

receive a response message, sent by the second device, in response to the second request message, where the response message that is in response to the second request message carries the updated data transfer policy.

Specifically, refer to the description in FIG. 8, and details are not described herein again.

Optionally, the user equipment further includes a receiving unit 1303, and the receiving unit 1303 is specifically configured to:

in a case in which the data transfer policy is updated, receive a message sent by the second device, where the message carries the updated data transfer policy; and the sending unit 1302 is specifically configured to:

send, by the first device to the second device, a response message that is in response to the message.

Specifically, refer to the description in FIG. 9, and details are not described herein again.

This embodiment of the present invention provides user equipment. In a case in which a first device is registered with a second device, the first device acquires a data transfer policy; and the first device sends data to the second device according to the data transfer policy, so that the user equipment improves efficiency of data sharing and data analysis by means of a DMR function of a network-side node.

Figure 14:
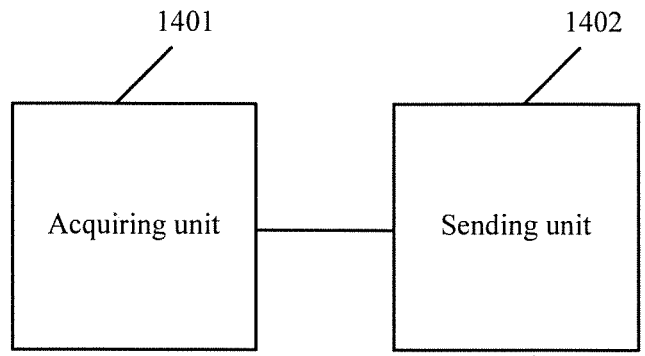
FIG. 14 is an apparatus structural diagram of user equipment according to the present invention.

Referring to FIG. 14, FIG. 14 is an apparatus structural diagram of user equipment according to the present invention. As shown in FIG. 14, the user equipment includes:

an acquiring unit 1401, configured to: when a first device is registered with a second device and a data transfer policy stored in the first device and a data transfer policy on the second device are updated, acquire the updated data transfer policy, where the first device is a user-side node in machine-to-machine communications M2M, and the second device is an infrastructure node in M2M.

Optionally, the acquiring unit 1401 is specifically configured to:

send, to the second device, a first request message for subscribing to the data transfer policy; and receive a response message, sent by the second device, in response to the first request message;

in a case in which the data transfer policy is updated, receive a message sent by the second device, where the message is used to indicate, to the first device, that the data transfer policy is updated;

send, to the second device, a second request message for requesting the updated data transfer policy; and receive a response message, sent by the second device, in response to the second request message, where the response message that is in response to the second request message carries the updated data transfer policy.

Specifically, refer to the description of the method in FIG. 8, and details are not described herein again.

Optionally, the acquiring unit 1401 is specifically configured to:

in a case in which the data transfer policy is updated, receive a message sent by the second device, where the message carries the updated data transfer policy; and send, to the second device, a response message that is in response to the message.

Specifically, refer to the description of the method in FIG. 9, and details are not described herein again.

Optionally, the data transfer policy includes at least one type of information in the following information:

information about a data sending period, and a trigger condition for sending data, where the information about a data sending period is used to indicate that the first device sends data to the second device in a preset period; and the trigger condition for sending data is used to indicate that the first device sends data to the second device when the trigger condition is satisfied; and the trigger condition includes at least one of the following conditions:

in a case in which a DMR data volume in the first device exceeds a preset DMR data volume, the first device sends data to the second device; and in a case in which the first device receives data of a preset particular data type, the first device sends data to the second device.

Optionally, the data transfer policy further includes at least one type of information in the following information:

a data type of data to be sent, a data size of data to be sent, and a destination address to which data is sent, where the data type of data to be sent includes at least one of the following data types:

time information, application data, subscription information, location information, device information, semantic information, communication status, and access permission.

A sending unit 1402, configured to send data to the second device according to the data transfer policy.

This embodiment of the present invention provides user equipment. In a case in which a first device is registered with a second device, the first device acquires a data transfer policy; and the first device sends data to the second device according to the data transfer policy, so that the user equipment improves efficiency of data sharing and data analysis by means of a DMR function of a network-side node.

Figure 15:
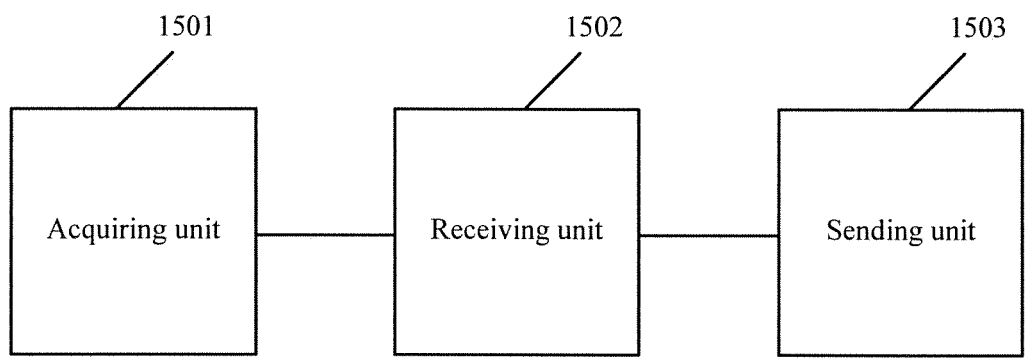
FIG. 15 is an apparatus structural diagram of a network device according to an embodiment of the present invention.

Referring to FIG. 15, FIG. 15 is an apparatus structural diagram of a network device according to an embodiment of the present invention. As shown in FIG. 15, the network device includes:

an acquiring unit 1501, configured to acquire a data transfer policy in a case in which a first device is registered with a second device, where the first device is a user-side node in machine-to-machine communications M2M, and the second device is an infrastructure node in M2M.

Optionally, the acquiring unit 1501 is specifically configured to:

acquire a prestored data transfer policy;

receive a request message that is sent by the first device and that requests the data transfer policy; and send, to the first device, a response message that is in response to the request message for requesting the data transfer policy, where the response message that is in response to the request message for requesting the data transfer policy carries the data transfer policy.

Specifically, refer to the description in FIG. 5, and details are not described herein again.

Optionally, the acquiring unit 1501 is specifically configured to:

acquire a prestored data transfer policy;

send a message to the first device, where the message carries the data transfer policy; and receive a response message, sent by the first device, in response to the message.

Specifically, refer to the description in FIG. 6, and details are not described herein again.

Optionally, the acquiring unit 1501 is specifically configured to:

receive a message sent by the first device, where the message carries the data transfer policy; and send, to the first device, a response message that is in response to the message.

Specifically, refer to the description in FIG. 7, and details are not described herein again.

A receiving unit 1502, configured to receive, according to the data transfer policy, data sent by the first device.

Optionally, the data transfer policy includes at least one type of information in the following information:

information about a data sending period, and a trigger condition for sending data, where the information about a data sending period is used to indicate that the first device sends data to the second device in a preset period; and the trigger condition for sending data is used to indicate that the first device sends data to the second device when the trigger condition is satisfied; and the trigger condition includes at least one of the following conditions:

in a case in which a DMR data volume in the first device exceeds a preset DMR data volume, the first device sends data to the second device; and in a case in which the first device receives data of a preset particular data type, the first device sends data to the second device.

The data transfer policy further includes at least one type of information in the following information:

a data type of data to be sent, a data size of data to be sent, and a destination address to which data is sent, where the data type of data to be sent includes at least one of the following data types:

time information, application data, subscription information, location information, device information device information, semantic information, communication status, and access permission.

Optionally, the receiving unit 1502 is specifically configured to:

receive a first request message, sent by the first device, for subscribing to the data transfer policy.

The network device further includes a sending unit 1503, and the sending unit 1503 is specifically configured to:

send, to the first device, a response message that is in response to the first request message; and in a case in which the data transfer policy is updated, send a message to the first device, where the message is used to indicate, to the first device, that the data transfer policy is updated.

The receiving unit 1502 is specifically configured to:

receive a second request message sent by the first device, where the second request is used to acquire, from the second device, the updated data transfer policy.

The sending unit 1503 is specifically configured to:

send, to the first device, a response message that is in response to the second request message, where the response message that is in response to the second request message carries the updated data transfer policy.

Specifically, refer to the description in FIG. 8, and details are not described herein again.

Optionally, the sending unit 1503 is further configured to:

in a case in which the data transfer policy is updated, send a message to the first device, where the message carries the updated data transfer policy.

The receiving unit 1502 is specifically configured to:

receive a response message, sent by the first device, in response to the message.

Specifically, refer to the description in FIG. 9, and details are not described herein again.

This embodiment of the present invention provides a network device. In a case in which a first device is registered with a second device, the first device acquires a data transfer policy; and the first device sends data to the second device according to the data transfer policy, so that the network device improves efficiency of data sharing and data analysis by means of a DMR function of a network-side node.

Figure 16:
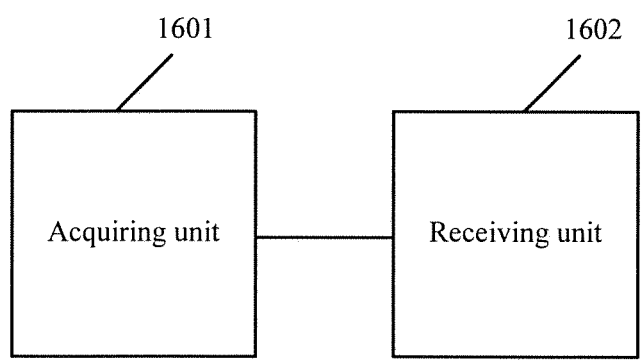
FIG. 16 is an apparatus structural diagram of a network device according to an embodiment of the present invention.

Referring to FIG. 16, FIG. 16 is an apparatus structural diagram of a network device according to an embodiment of the present invention. As shown in FIG. 16, the network device includes the following unit:

an acquiring unit 1601, configured to: when a first device is registered with a second device and a data transfer policy stored in the first device and a data transfer policy on the second device are updated, acquire the updated data transfer policy, where the first device is a user-side node in machine-to-machine communications M2M, and the second device is an infrastructure node in M2M.

Optionally, the acquiring unit 1601 is specifically configured to:

receive a first request message, sent by the first device, for subscribing to the data transfer policy;

send, to the first device, a response message that is in response to the first request message;

in a case in which the data transfer policy is updated, send a message to the first device, where the message is used to indicate, to the first device, that the data transfer policy is updated;

receive a second request message sent by the first device, where the second request is used to acquire, from the second device, the updated data transfer policy; and send, to the first device, a response message that is in response to the second request message, where the response message that is in response to the second request message carries the updated data transfer policy.

Specifically, refer to the description in FIG. 8, and details are not described herein again.

Optionally, the acquiring unit 1601 is specifically configured to:

in a case in which the data transfer policy is updated, send a message to the first device, where the message carries the updated data transfer policy; and receive a response message, sent by the first device, in response to the message.

Specifically, refer to the description in FIG. 9, and details are not described herein again.

A receiving unit 1602, configured to receive, according to the data transfer policy, data sent by the first device.

Optionally, the data transfer policy includes at least one type of information in the following information:

information about a data sending period, and a trigger condition for sending data, where the information about a data sending period is used to indicate that the first device sends data to the second device in a preset period; and the trigger condition for sending data is used to indicate that the first device sends data to the second device when the trigger condition is satisfied; and the trigger condition includes at least one of the following conditions:

in a case in which a DMR data volume in the first device exceeds a preset DMR data volume, the first device sends data to the second device; and in a case in which the first device receives data of a preset particular data type, the first device sends data to the second device.

The data transfer policy further includes at least one type of information in the following information:

a data type of data to be sent, a data size of data to be sent, and a destination address to which data is sent, where the data type of data to be sent includes at least one of the following data types:

time information, application data, subscription information, location information, device information, semantic information, communication status, and access permission.

This embodiment of the present invention provides a network device. In a case in which a first device is registered with a second device, the first device acquires a data transfer policy; and the first device sends data to the second device according to the data transfer policy, so that the network device improves efficiency of data sharing and data analysis by means of a DMR function of a network-side node.

Figure 17:
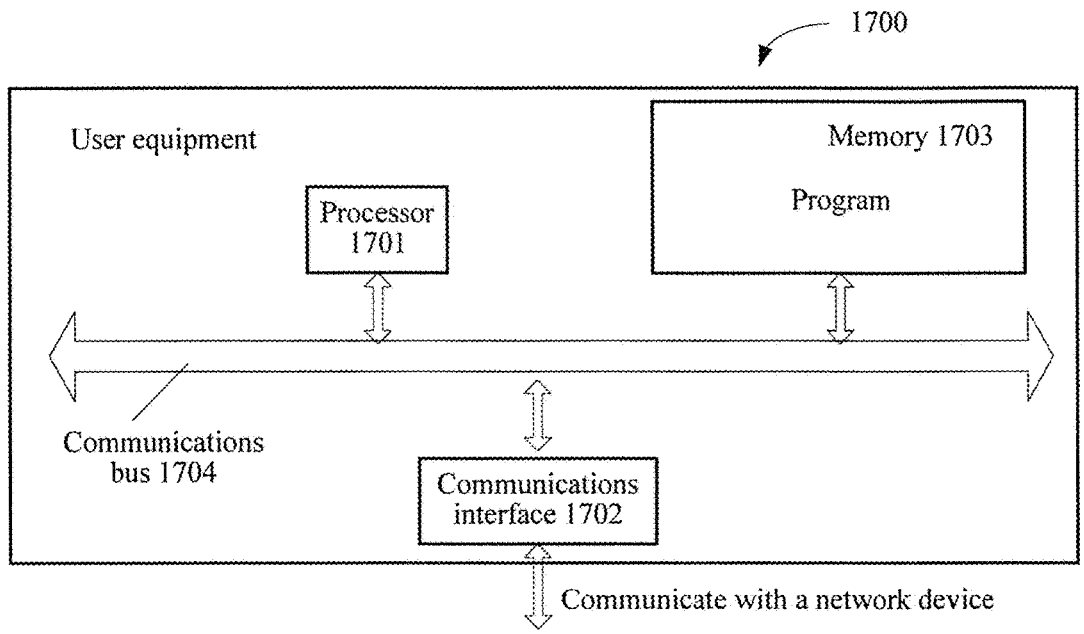
FIG. 17 is an apparatus structural diagram of user equipment according to the present invention.

Referring to FIG. 17, FIG. 17 is an apparatus structural diagram of user equipment according to an embodiment of the present invention. As shown in FIG. 17, referring to FIG. 17, FIG. 17 is user equipment 1700 according to an embodiment of the present invention. The specific embodiment of the present invention does not limit specific implementation of the user equipment. The user equipment 1700 includes:

a processor (processor) 1701, a communications interface (Communications Interface) 1702, a memory (memory) 1703, and a bus 1704.

The processor 1701, the communications interface 1702, and the memory 1703 communicate with each other by using the bus 1704.

The communications interface 1702 is configured to communicate with a network device.

The processor 1701 is configured to execute a program.

Specifically, the program may include program code, and the program code includes a computer operation instruction.

The processor 1701 may be a central processing unit CPU or an application-specific integrated circuit ASIC (Application Specific Integrated Circuit), or may be configured as one or more integrated circuits for implementing the embodiments of the present invention.

The memory 1703 is configured to store the program. The memory 1703 may include a high-speed RAM memory, or may further include a non-volatile memory (non-volatile memory), for example, at least one magnetic disk storage. The program may specifically include:

acquiring, by a first device, a data transfer policy in a case in which the first device is registered with a second device; and sending, by the first device, data to the second device according to the data transfer policy, where the first device is a user-side node in machine-to-machine communications M2M, and the second device is an infrastructure node in M2M.

The acquiring a data transfer policy in a case in which a first device is registered with a second device includes:

sending, by the first device to the second device, a request message for requesting the data transfer policy; and receiving a response message, sent by the second device, in response to the request message for requesting the data transfer policy, where the response message that is in response to the request message for requesting the data transfer policy carries the data transfer policy.

The acquiring a data transfer policy in a case in which a first device is registered with a second device includes:

receiving a message sent by the second device, where the message carries the data transfer policy; and in a case in which the message sent by the second device is received, sending, to the second device, a response message that is in response to the message.

The acquiring a data transfer policy in a case in which a first device is registered with a second device includes:

acquiring, by the first device, a prestored data transfer policy, and sending a message to the second device, where the message carries the data transfer policy; and receiving a response message, sent by the second device, in response to the message.

The data transfer policy includes at least one type of information in the following information:

information about a data sending period, and a trigger condition for sending data, where the information about a data sending period is used to indicate that the first device sends data to the second device in a preset period; and the trigger condition for sending data is used to indicate that the first device sends data to the second device when the trigger condition is satisfied; and the trigger condition includes at least one of the following conditions:

in a case in which a DMR data volume in the first device exceeds a preset DMR data volume, the first device sends data to the second device; and in a case in which the first device receives data of a preset particular data type, the first device sends data to the second device.

The data transfer policy further includes at least one type of information in the following information:

a data type of data to be sent, a data size of data to be sent, and a destination address to which data is sent, where the data type of data to be sent includes at least one of the following data types:

time information, application data, subscription information, location information, device information, semantic information, communication status, and access permission.

The method further includes:

sending, by the first device to the second device, a first request message for subscribing to the data transfer policy;

receiving, by the first device, a response message, sent by the second device, in response to the first request message;

in a case in which the data transfer policy is updated, receiving a message sent by the second device, where the message is used to indicate, to the first device, that the data transfer policy is updated;

sending, by the first device, a second request message to the second device, where the second request is used to acquire, from the second device, the data transfer policy that is updated; and receiving, by the first device, a response message, sent by the second device, in response to the second request message, where the response message that is in response to the second request message carries the updated data transfer policy.

The method further includes:

in a case in which the data transfer policy is updated, receiving a message sent by the second device, where the message carries the updated data transfer policy; and sending, by the first device to the second device, a response message that is in response to the message.

A data transmission method, where the method includes:

acquiring, when a first device is registered with a second device and a data transfer policy stored in the first device and a data transfer policy on the second device are updated, the updated data transfer policy; and sending, by the first device, data to the second device according to the data transfer policy.

The acquiring, when a first device is registered with a second device and a data transfer policy stored in the first device and a data transfer policy on the second device are updated, the updated data transfer policy includes:

sending, by the first device to the second device, a first request message for subscribing to the data transfer policy;

receiving, by the first device, a response message, sent by the second device, in response to the first request message;

in a case in which the data transfer policy is updated, receiving, by the first device, a message sent by the second device, where the message is used to indicate, to the first device, that the data transfer policy is updated;

sending, by the first device to the second device, a second request message for requesting the updated data transfer policy; and receiving, by the first device, a response message, sent by the second device, in response to the second request message, where the response message that is in response to the second request message carries the updated data transfer policy.

The acquiring, when a first device is registered with a second device and a data transfer policy stored in the first device and a data transfer policy on the second device are updated, the updated data transfer policy includes:

in a case in which the data transfer policy is updated, receiving a message sent by the second device, where the message carries the updated data transfer policy; and sending, by the first device to the second device, a response message that is in response to the message.

The data transfer policy includes at least one type of information in the following information:

information about a data sending period, and a trigger condition for sending data, where the information about a data sending period is used to indicate that the first device sends data to the second device in a preset period; and the trigger condition for sending data is used to indicate that the first device sends data to the second device when the trigger condition is satisfied; and the trigger condition includes at least one of the following conditions:

in a case in which a DMR data volume in the first device exceeds a preset DMR data volume, the first device sends data to the second device; and in a case in which the first device receives data of a preset particular data type, the first device sends data to the second device.

The data transfer policy further includes at least one type of information in the following information:

a data type of data to be sent, a data size of data to be sent, and a destination address to which data is sent, where the data type of data to be sent includes at least one of the following data types:

time information, application data, subscription information, location information, device information, semantic information, communication status, and access permission.

This embodiment of the present invention provides user equipment. In a case in which a first device is registered with a second device, the first device acquires a data transfer policy; and the first device sends data to the second device according to the data transfer policy, so that the user equipment improves efficiency of data sharing and data analysis by means of a DMR function of a network-side node.

Figure 18:
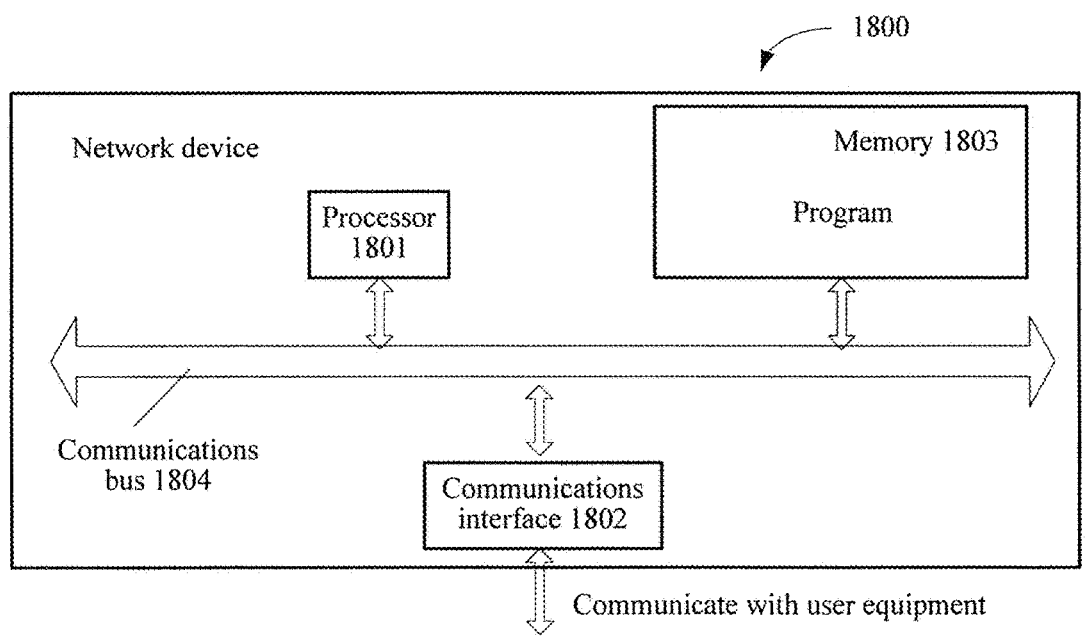
FIG. 18 is an apparatus structural diagram of a network device according to an embodiment of the present invention.

Referring to FIG. 18, FIG. 18 is an apparatus structural diagram of a network device according to an embodiment of the present invention. As shown in FIG. 18, referring to FIG. 18, FIG. 18 is a network device 1800 according to an embodiment of the present invention. This specific embodiment of the present invention does not limit specific implementation of the user equipment. The network device 1800 includes:

a processor (processor) 1801, a communications interface (Communications Interface) 1802, a memory (memory) 1803, and a bus 1804.

The processor 1801, the communications interface 1802, and the memory 1803 communicate with each other by using the bus 1804.

The communications interface 1802 is configured to communicate with user equipment.

The processor 1801 is configured to execute a program.

Specifically, the program may include program code, and the program code includes a computer operation instruction.

The processor 1801 may be a central processing unit CPU or an application-specific integrated circuit ASIC (Application Specific Integrated Circuit), or may be configured as one or more integrated circuits for implementing the embodiments of the present invention.

The memory 1803 is configured to store the program. The memory 1803 may include a high-speed RAM memory, or may further include a non-volatile memory (non-volatile memory), for example, at least one magnetic disk storage. The program may specifically include:

a data transmission method, where the method includes:

acquiring, by a second device, a data transfer policy in a case in which a first device is registered with the second device; and receiving, by the second device according to the data transfer policy, data sent by the first device, where the first device is a user-side node in machine-to-machine communications M2M, and the second device is an infrastructure node in M2M.

The acquiring, by a second device, a data transfer policy in a case in which a first device is registered with the second device includes:

acquiring, by the second device, a prestored data transfer policy;

receiving, by the second device, a request message that is sent by the first device and that requests the data transfer policy; and sending, by the second device to the first device, a response message that is in response to the request message for requesting the data transfer policy, where the response message that is in response to the request message for requesting the data transfer policy carries the data transfer policy.

The acquiring, by a second device, a data transfer policy in a case in which a first device is registered with the second device includes:

acquiring, by the second device, a prestored data transfer policy;

sending, by the second device, a message to the first device, where the message carries the data transfer policy; and receiving, by the second device, a response message, sent by the first device, in response to the message.

The acquiring, by a second device, a data transfer policy in a case in which a first device is registered with the second device includes:

receiving, by the second device, a message sent by the first device, where the message carries the data transfer policy; and sending, by the second device to the first device, a response message that is in response to the message.

The data transfer policy includes at least one type of information in the following information:

information about a data sending period, and a trigger condition for sending data, where the information about a data sending period is used to indicate that the first device sends data to the second device in a preset period; and the trigger condition for sending data is used to indicate that the first device sends data to the second device when the trigger condition is satisfied; and the trigger condition includes at least one of the following conditions:

in a case in which a DMR data volume in the first device exceeds a preset DMR data volume, the first device sends data to the second device; and in a case in which the first device receives data of a preset particular data type, the first device sends data to the second device.

The data transfer policy further includes at least one type of information in the following information:

a data type of data to be sent, a data size of data to be sent, and a destination address to which data is sent, where the data type of data to be sent includes at least one of the following data types:

time information, application data, subscription information, location information, device information device information, semantic information, communication status, and access permission.

The method further includes:

receiving, by the second device, a first request message, sent by the first device, for subscribing to the data transfer policy;

sending, by the second device to the first device, a response message that is in response to the first request message;

in a case in which the data transfer policy is updated, sending a message to the first device, where the message is used to indicate, to the first device, that the data transfer policy is updated;

receiving, by the second device, a second request message sent by the first device, where the second request is used to acquire, from the second device, the updated data transfer policy; and sending, by the second device to the first device, a response message that is in response to the second request message, where the response message that is in response to the second request message carries the updated data transfer policy.

The method further includes:

in a case in which the data transfer policy is updated, sending, by the second device, a message to the first device, where the message carries the updated data transfer policy; and receiving, by the second device, a response message, sent by the first device, in response to the message.

A data transmission method, where the method includes:

acquiring, when a first device is registered with a second device and a data transfer policy stored in the first device and a data transfer policy on the second device are updated, the updated data transfer policy; and receiving, by the second device according to the data transfer policy, data sent by the first device.

The acquiring, when a first device is registered with a second device and a data transfer policy stored in the first device and a data transfer policy on the second device are updated, the updated data transfer policy includes:

receiving, by the second device, a first request message, sent by the first device, for subscribing to the data transfer policy;

sending, by the second device to the first device, a response message that is in response to the first request message;

in a case in which the data transfer policy is updated, sending a message to the first device, where the message is used to indicate, to the first device, that the data transfer policy is updated;

receiving, by the second device, a second request message sent by the first device, where the second request is used to acquire, from the second device, the updated data transfer policy; and sending, by the second device to the first device, a response message that is in response to the second request message, where the response message that is in response to the second request message carries the updated data transfer policy.

The acquiring, when a first device is registered with a second device and a data transfer policy stored in the first device and a data transfer policy on the second device are updated, the updated data transfer policy includes:

in a case in which the data transfer policy is updated, sending, by the second device, a message to the first device, where the message carries the updated data transfer policy; and receiving, by the second device, a response message, sent by the first device, in response to the message.

The data transfer policy includes at least one type of information in the following information:

information about a data sending period, and a trigger condition for sending data, where the information about a data sending period is used to indicate that the first device sends data to the second device in a preset period; and the trigger condition for sending data is used to indicate that the first device sends data to the second device when the trigger condition is satisfied; and the trigger condition includes at least one of the following conditions:

in a case in which a DMR data volume in the first device exceeds a preset DMR data volume, the first device sends data to the second device; and in a case in which the first device receives data of a preset particular data type, the first device sends data to the second device.

The data transfer policy further includes at least one type of information in the following information:

a data type of data to be sent, a data size of data to be sent, and a destination address to which data is sent, where the data type of data to be sent includes at least one of the following data types:

time information, application data, subscription information, location information, device information, semantic information, communication status, and access permission.

The present invention provides a network device. In a case in which a first device is registered with a second device, the first device acquires a data transfer policy; and the first device sends data to the second device according to the data transfer policy, so that the network device improves efficiency of data sharing and data analysis by means of a DMR function of a network-side node.

The foregoing descriptions are merely exemplary implementation manners of the present invention, but are not intended to limit the protection scope of the present invention. Any modification, equivalent replacement, and improvement made without departing from the spirit and principle of the present invention shall fall within the protection scope of the present invention.

What is claimed is:

1. A data transmission method, wherein the method comprises comprising:

acquiring, by a first device from a second device, a data transfer policy in a case in which when the first device is registered with the second device; sending, by the first device, data to the second device according to the data transfer policy, wherein the first device is in machine-to-machine (M2M) communications with the second device; wherein the data transfer policy comprises at least one type of the following information: information about a data sending period for indicating that the first device sends data to the second device in a preset period; and a trigger condition for sending data for indicating that the first device sends data to the second device when the trigger condition is satisfied, wherein the trigger condition comprises at least one of the following conditions: when a data management repository (DMR) data volume in the first device exceeds a preset DMR data volume, the first device sends data to the second device; and when the first device receives data of a preset particular data type, the first device sends data to the second device.

2. The method according to claim 1, wherein acquiring the data transfer policy comprises:

sending, by the first device to the second device, a request message for requesting the data transfer policy; and receiving, by the first device from the second device, a response message that comprises the data transfer policy in response to the request message for requesting the data transfer policy.

3. The method according to claim 1, wherein acquiring the data transfer policy comprises:

receiving, by the first device from the second device, a message that comprises the data transfer policy; and sending, by the first device to the second device, a response message in response to receiving the message that comprises the data transfer policy from the second device.

4. The method according to claim 1, further comprising:

sending, by the first device, a message that carries the data transfer policy to the second device; and receiving, by the first device, a response message from the second device in response to the message that carries the data transfer policy.

5. The method according to claim 1, wherein the data transfer policy further comprises at least one type of the following information:

a data type of data to be sent, a data size of data to be sent, and a destination address to which data is sent, wherein the data type of data to be sent comprises at least one of the following data types:

time information, application data, subscription information, location information, device information, semantic information, communication status, and access permission.

6. The method according to claim 1, further comprising:

sending, by the first device to the second device, a first request message for subscribing to the data transfer policy;

receiving, by the first device, a response message from the second device in response to the first request message;

when the data transfer policy is updated, receiving a message from the second device for indicating, to the first device, that the data transfer policy is updated;

sending, by the first device, a second request message to the second device for acquiring, from the second device, the updated data transfer policy; and receiving, by the first device, a response message that comprises the updated data transfer policy from the second device in response to the second request message.

7. The method according to claim 1, further comprising:
when the data transfer policy is updated, receiving, by the first device, a message that comprises the updated transfer policy from the second device; and
in response to receiving the message that comprises the updated transfer policy from the second device, sending, by the first device to the second device, a response message.

8. The method according to claim 1, wherein the first device comprises a user-side node and the second device comprises an infrastructure node.

9. A data transmission method, comprising:
when a first device is registered with a second device and a data transfer policy on the second device is updated, acquiring, by the first device, the updated data transfer policy from the second device;
sending, by the first device, data to the second device according to the updated data transfer policy, wherein the first device is in machine-to-machine (M2M) communications with the second device; and
wherein acquiring the updated data transfer policy, comprises:
sending, by the first device to the second device, a first request message for subscribing to the data transfer policy;
receiving, by the first device, a response message from the second device in response to the first request message;
when the data transfer policy is updated, receiving, by the first device, a message from the second device for indicating, to the first device, that the data transfer policy is updated;
sending, by the first device to the second device, a second request message for requesting the updated data transfer policy; and
receiving, by the first device from the second device, a response message that comprises the updated data transfer policy in response to the second request message.

10. The method according to claim 9, wherein the first device comprises a user-side node and the second device comprises an infrastructure node.

11. A data transmission method, comprising:
when a first device is registered with a second device and a data transfer policy on the second device is updated, acquiring, by the first device, the updated data transfer policy from the second device;
sending, by the first device, data to the second device according to the updated data transfer policy, wherein the first device is in machine-to-machine (M2M) communications with the second device; and
wherein the data transfer policy comprises at least one type of the following information:
information about a data sending period for indicating that the first device sends data to the second device in a preset period; and
a trigger condition for sending data for indicating that the first device sends data to the second device when the trigger condition is satisfied, wherein the trigger condition comprises at least one of the following conditions:
when a data management repository (DMR) data volume in the first device exceeds a preset DMR data volume, the first device sends data to the second device, and
when the first device receives data of a preset particular data type, the first device sends data to the second device.

12. The method according to claim 11, wherein the data transfer policy further comprises at least one type of the following information:
a data type of data to be sent, a data size of data to be sent, and a destination address to which data is sent, wherein the data type of data to be sent comprises at least one of the following data types:
time information, application data, subscription information, location information, device information, semantic information, communication status, and access permission.

13. A data transmission method, comprising:
sending, by a second device to a first device, a data transfer policy when the first device is registered with the second device;
receiving, by the second device according to the data transfer policy, data from the first device, wherein the first device is in machine-to-machine (M2M) communications with the second device; and
wherein the data transfer policy comprises at least one type of the following information:
information about a data sending period for indicating that the first device sends data to the second device in a preset period; and
a trigger condition for sending data for indicating that the first device sends data to the second device when the trigger condition is satisfied, wherein the trigger condition comprises at least one of the following conditions:
when a data management repository (DMR) data volume in the first device exceeds a preset DMR data volume, the first device sends data to the second device; and
when the first device receives data of a preset particular data type, the first device sends data to the second device.

14. The method according to claim 13, further comprising:
receiving, by the second device, a request message from the first device that requests the data transfer policy; and
sending, by the second device to the first device, a response message that comprises the data transfer policy in response to the request message for requesting the data transfer policy.

15. The method according to claim 13, further comprising:
sending, by the second device, a message that comprises the data transfer policy to the first device; and
receiving, by the second device, a response message from the first device in response to the message that comprises the data transfer policy.

16. The method according to claim 13, further comprising:
receiving, by the second device, a message that carries the data transfer policy from the first device; and
in response to receiving the message that carries the data transfer policy, sending, by the second device to the first device, a response message.

17. The method according to claim 13, wherein the data transfer policy further comprises at least one type of the following information:
a data type of data to be sent, a data size of data to be sent, and a destination address to which data is sent, wherein the data type of data to be sent comprises at least one of the following data types:
time information, application data, subscription information, location information, device information, semantic information, communication status, and access permission.

18. The method according to claim 13, further comprising:
receiving, by the second device, a first request message from the first device for subscribing to the data transfer policy;
sending, by the second device to the first device, a response message in response to the first request message;
when the data transfer policy is updated, sending a message to the first device for indicating, to the first device, that the data transfer policy is updated;
receiving, by the second device, a second request message from the first device for acquiring, from the second device, the updated data transfer policy; and
in response to receiving the second request message, sending, by the second device to the first device, a response message comprising the updated data transfer policy.

19. The method according to claim 13, further comprising:
when the data transfer policy is updated, sending, by the second device, a message that comprises the updated data transfer policy to the first device; and
receiving, by the second device, a response message from the first device in response to the message that comprises the updated data transfer policy.

20. The method according to claim 13, wherein the first device comprises a user-side node and the second device comprises an infrastructure node.

21. A data transmission method, comprising:
when a first device is registered with a second device and a data transfer policy on the second device is updated, acquiring, by the first device, the updated data transfer policy from the second device;
receiving, by the second device according to the updated data transfer policy, data from the first device, wherein the first device is in machine-to-machine (M2M) communications with the second device;
wherein acquiring the updated data transfer policy comprises:
receiving, by the second device, a first request message from the first device for subscribing to the data transfer policy;
sending, by the second device to the first device, a response message in response to the first request message;
when the data transfer policy is updated, sending a message to the first device for indicating, to the first device, that the data transfer policy is updated;
receiving, by the second device, a second request message from the first device for acquiring, from the second device, the updated data transfer policy; and
sending, by the second device to the first device, a response message that comprises the updated data transfer policy in response to the second request message.

22. The method according to claim 21, wherein the first device comprises a user-side node and the second device comprises an infrastructure node.

23. A data transmission method, comprising:
when a first device is registered with a second device and a data transfer policy on the second device is updated, acquiring, by the first device, the updated data transfer policy from the second device;
receiving, by the second device according to the updated data transfer policy, data from by the first device, wherein the first device is in machine-to-machine (M2M) communications with the second device; and
wherein the data transfer policy comprises at least one type of the following information:
information about a data sending period for indicating that the first device sends data to the second device in a preset period; and
a trigger condition for sending data is used to indicate that the first device sends data to the second device when the trigger condition is satisfied, wherein the trigger condition comprises at least one of the following conditions:
when a data management repository (DMR) data volume in the first device exceeds a preset DMR data volume, the first device sends data to the second device, and
when the first device receives data of a preset particular data type, the first device sends data to the second device.

24. The method according to claim 23, wherein the data transfer policy further comprises at least one type of the following information:
a data type of data to be sent, a data size of data to be sent, and a destination address to which data is sent, wherein the data type of data to be sent comprises at least one of the following data types:
time information, application data, subscription information, location information, device information, semantic information, communication status, and access permission.

25. The method according to claim 23, wherein the first device comprises a user-side node and the second device comprises an infrastructure node.

26. User equipment (UE), comprising:
a processor; and
memory coupled to the processor, the memory comprising instructions that, when executed by the processor, cause the UE to:
acquire a data transfer policy from a second device when the UE is registered with the second device; and
send data to the second device according to the data transfer policy, wherein the UE is in machine-to-machine (M2M) communications with the second device;
wherein the data transfer policy comprises at least one type of the following information:
information about a data sending period for indicating that the UE sends data to the second device in a preset period; and
a trigger condition for sending data for indicating that the UE sends data to the second device when the trigger condition is satisfied, wherein the trigger condition comprises at least one of the following conditions:
when a data management repository (DMR) data volume in the UE exceeds a preset DMR data volume, the UE sends data to the second device; and when the UE receives data of a preset particular data type, the UE sends data to the second device.

27. The user equipment according to claim 26, wherein the instructions, when executed by the processor, cause the UE to:
send, to the second device, a request message for requesting the data transfer policy; and
receive a response message that comprises the data transfer policy from the second device in response to the request message for requesting the data transfer policy.

28. The user equipment according to claim 26, wherein the instructions, when executed by the processor, cause the UE to:
receive a message that comprises the data transfer policy from the second device; and
in response to receiving the message that comprises the data transfer policy from the second device, send, to the second device, a response message.

29. The user equipment according to claim 26, wherein the instructions, when executed by the processor, cause the UE to:
send a message that comprises the data transfer policy to the second device; and
receive a response message from the second device in response to the message that comprises the data transfer policy.

30. The user equipment according to claim 26, wherein the data transfer policy further comprises at least one type of the following information:
a data type of data to be sent, a data size of data to be sent, and a destination address to which data is sent, wherein the data type of data to be sent comprises at least one of the following data types: time information, application data, subscription information, location information, device information, semantic information, communication status, and access permission.

31. The user equipment according to claim 26, wherein the instructions, when executed by the processor, cause the UE to:
send, to the second device, a first request message for subscribing to the data transfer policy; receive a response message from the second device in response to the first request message;
when the data transfer policy is updated, receive a message from the second device for indicating, to the UE, that the data transfer policy is updated; send a second request message to the second device for acquiring, from the second device, the updated data transfer policy;
and receive a response message that comprises the updated data transfer policy from the second device in response to the second request message.

32. The user equipment according to claim 26, wherein the instructions, when executed by the processor, cause the UE to:
when the data transfer policy is updated, receive a message that comprises the updated data transfer policy from the second device; and in response to the received message that comprises the updated data transfer policy send a response message to the second device.

33. The user equipment according to claim 26, wherein the second device comprises an infrastructure node.

34. User equipment (UE), comprising:
a processor; and
memory coupled to the processor, the memory comprising instructions that, when executed by the processor, cause the UE to:
when the UE is registered with a second device and a data transfer policy on the second device is updated, acquire the updated data transfer policy;
send data to the second device according to the updated data transfer policy, wherein the UE is in machine-to-machine communications (M2M) with the second device;
send, to the second device, a first request message for subscribing to the data transfer policy;
receive a response message from the second device in response to the first request message;
when the data transfer policy is updated, receive a message from the second device for indicating, to the UE, that the data transfer policy is updated;
send, to the second device, a second request message for requesting the updated data transfer policy; and
receive a response message that comprises the updated data transfer policy from the second device in response to the second request message.

35. The user equipment according to claim 34, wherein the second device comprises an infrastructure node.

36. User equipment (UE), comprising:
a processor;
memory coupled to the processor, the memory comprising instructions that, when executed by the processor, cause the UE to:
when the UE is registered with a second device and a data transfer policy on the second device is updated, acquire the updated data transfer policy;
send data to the second device according to the updated data transfer policy, wherein the UE is in machine-to-machine communications (M2M) with the second device; and
wherein the data transfer policy comprises at least one type of the following information:
information about a data sending period for indicating that the UE sends data to the second device in a preset period; and
a trigger condition for sending data for indicating that the UE sends data to the second device when the trigger condition is satisfied, wherein the trigger condition comprises at least one of the following conditions:
when a data management repository (DMR) data volume in the UE exceeds a preset DMR data volume, the UE sends data to the second device, and
when the UE receives data of a preset particular data type, the UE sends data to the second device.

37. The user equipment according to claim 36, wherein the data transfer policy further comprises at least one type of the following information:
a data type of data to be sent, a data size of data to be sent, and a destination address to which data is sent, wherein the data type of data to be sent comprises at least one of the following data types:
time information, application data, subscription information, location information, device information, semantic information, communication status, and access permission.

38. The user equipment according to claim 36, wherein the second device comprises an infrastructure node.

39. A network device, comprising:
a processor; and
memory coupled to the processor, the memory comprising instructions that, when executed by the processor, cause the network device to:
send a data transfer policy to a first device when the first device is registered with the network device; and
receive, according to the data transfer policy, data from the first device, wherein the first device is in machine-to-machine communications (M2M) with the network device;
wherein the data transfer policy comprises at least one type of the following information:
information about a data sending period for indicating that the first device sends data to the network device in a preset period; and
a trigger condition for sending data for indicating that the first device sends data to the network device when the trigger condition is satisfied, wherein the trigger condition comprises at least one of the following conditions:
when a data management repository (DMR) data volume in the first device exceeds a preset DMR data volume, the first device sends data to the network device; and
when the first device receives data of a preset particular data type, the first device sends data to the network device.

40. The network device according to claim 39, wherein the instructions, when executed by the processor, cause the network device to:
receive a request message from the first device that requests the data transfer policy; and
in response to the request message, send, to the first device, a response message that comprises the data transfer policy.

41. The network device according to claim 39, wherein the instructions, when executed by the processor, cause the network device to:
send a message that comprises the data transfer policy to the first device; and
receive a response message from the first device in response to the message that comprises the data transfer policy.

42. The network device according to claim 39, wherein the instructions, when executed by the processor, cause the network device to:
receive a message that comprises the data transfer data policy from the first device; and
send, to the first device, a response message in response to the received message that comprises the data transfer data policy.

43. The network device according to claim 39, wherein the data transfer policy further comprises at least one type of the following information:
a data type of data to be sent, a data size of data to be sent, and a destination address to which data is sent, wherein the data type of data to be sent comprises at least one of the following data types:
time information, application data, subscription information, location information, device information device information, semantic information, communication status, and access permission.

44. The network device according to claim 39, wherein the instructions, when executed by the processor, cause the network device to:
receive a first request message, from the first device, for subscribing to the data transfer policy;
send, to the first device, a response message that is in response to the first request message;
when the data transfer policy is updated, send a message to the first device for indicating, to the first device, that the data transfer policy is updated;
receive a second request message from the first device for acquiring, from the network device, the updated data transfer policy; and
in response to the second request message, send, to the first device, a response message that comprises the updated data transfer policy.

45. The network device according to claim 39, wherein the instructions, when executed by the processor, cause the network device to:
when the data transfer policy is updated, send a message that comprises the updated data transfer policy to the first device; and
receive a response message from the first device in response to the message that comprises the updated data transfer policy.

46. The network device according to claim 39, wherein the first device comprises a user equipment (UE).

47. A network device, comprising:
a processor; and
memory coupled to the processor, the memory comprising instructions that, when executed by the processor, cause the network device to:
when a first device is registered with the network device and a data transfer policy on the network device is updated, send the updated data transfer policy to the first device;
receive, according to the updated data transfer policy, data from the first device, wherein the first device is in machine-to-machine communications (M2M) with the network device;
receive a first request message from the first device for subscribing to the data transfer policy;
send, to the first device, a response message that is in response to the first request message;
when the data transfer policy is updated, send a message to the first device for indicating, to the first device, that the data transfer policy is updated;
receive a second request message from the first device for acquiring, from the second device, the updated data transfer policy; and
in response to the received second request message, send, to the first device, a response message that comprises the data transfer policy.

48. The user equipment according to claim 47, wherein the first device comprises a user equipment (UE).

49. A network device, comprising:
a processor; and
memory coupled to the processor, the memory comprising instructions that, when executed by the processor, cause the network device to:
when a first device is registered with the network device and a data transfer policy on the network device is updated, send the updated data transfer policy to the first device;
receive, according to the updated data transfer policy, data from the first device, wherein the first device is in machine-to-machine communications (M2M) with the network device;

wherein the data transfer policy comprises at least one type of the following information:

information about a data sending period for indicating that the first device sends data to the network device in a preset period; and a trigger condition for sending data for indicating that the first device sends data to the network device when the trigger condition is satisfied, wherein the trigger condition comprises at least one of the following conditions:

when a data management repository (DMR) data volume in the first device exceeds a preset DMR data volume, the first device sends data to the network device, and when the first device receives data of a preset particular data type, the first device sends data to the network device.

50. The network device according to claim 49, wherein the data transfer policy further comprises at least one type of the following information:

a data type of data to be sent, a data size of data to be sent, and a destination address to which data is sent, wherein the data type of data to be sent comprises at least one of the following data types:

time information, application data, subscription information, location information, device information, semantic information, communication status, and access permission.

51. The user equipment according to claim 49, wherein the first device comprises a user equipment (UE).

\* \* \* \* \*